(12) United States Patent
Minoura et al.

(10) Patent No.: US 8,647,097 B2
(45) Date of Patent: Feb. 11, 2014

(54) INTERMITTENT FILM FORMING SYSTEM AND INTERMITTENT FILM FORMING METHOD

(75) Inventors: Kiyoshi Minoura, Otsu (JP);
Nobutsugu Chigira, Otsu (JP);
Fumiyasu Nomura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/536,206

(22) Filed: Jun. 28, 2012

(65) Prior Publication Data

US 2012/0273998 A1 Nov. 1, 2012

Related U.S. Application Data

(62) Division of application No. 12/443,116, filed as application No. PCT/JP2007/068685 on Sep. 26, 2007, now Pat. No. 8,231,372.

(30) Foreign Application Priority Data

Sep. 27, 2006 (JP) ................................. 2006-262874
Sep. 27, 2006 (JP) ................................. 2006-262880

(51) Int. Cl.
*B29C 59/02* (2006.01)
(52) U.S. Cl.
USPC .......................................... 425/112; 264/284
(58) Field of Classification Search
USPC ........................................................ 425/112
See application file for complete search history.

(56) References Cited

U.S. PATENT DOCUMENTS

| 4,363,471 A | * | 12/1982 | Yanagishima et al. ........ 266/111 |
| 4,576,344 A | | 3/1986 | Sasaki et al. |
| 5,141,584 A | | 8/1992 | Schuh et al. |
| 5,344,521 A | | 9/1994 | Ohsaki |
| 5,788,811 A | | 8/1998 | Yamamoto et al. |
| 6,877,738 B2 | | 4/2005 | Sonoda et al. |

FOREIGN PATENT DOCUMENTS

| JP | 1-048246 A | 2/1989 |
| JP | 2002-003078 A | 1/2002 |
| JP | 2002-104726 A | 4/2002 |
| JP | 2004-288845 A | 10/2004 |
| JP | 2005-199455 A | 7/2005 |
| JP | 2005-310286 A | 11/2005 |
| JP | 2006-032400 A | 2/2006 |

OTHER PUBLICATIONS

International Search Report dated Dec. 4, 2007, application No. PCT/JP2007/068685.

* cited by examiner

*Primary Examiner* — Larry Thrower
*Assistant Examiner* — Xue Liu
(74) *Attorney, Agent, or Firm* — RatnerPrestia

(57) ABSTRACT

An intermittent film forming system is provided, comprising a mold having a fine projections and depressions shape formed on the surface, a press for pressing a film to the surface of the mold, a transportation for carrying the film, and a releasing device for releasing the film from the mold surface. The releasing device is provided with a stripper roll for stripping the film, a means for rotary driving the stripper roll, an auxiliary roll arranged substantially in parallel with the stripper roll across a film path line, a means for moving the auxiliary roll on the periphery of the stripper roll such that the film embraces the stripper roll, and a guide for moving the stripper roll and the auxiliary roll in the vicinity of the surface of the mold in parallel therewith, while maintaining the relative positional relationship that the film embraces the stripper roll.

5 Claims, 10 Drawing Sheets

INTERMITTENT FILM FORMING SYSTEM AND INTERMITTENT FILM FORMING METHOD

CROSS-REFERENCE TO RELATED APPLICATIONS

This is a divisional application of pending U.S. application Ser. No. 12/443,116, filed Mar. 26, 2009, which was a U.S. National Phase application of PCT international application number PCT/JP2007/068685, filed Sep. 26, 2007, which claims priority benefit of JP 2006-262874, filed Sep. 27, 2006, and JP 2006-262880, filed Sep. 27, 2006, which applications are incorporated herein by reference in their entireties.

TECHNICAL FIELD

The present invention relates to a film forming system and a film forming method that feed out, for example, a continuous film wound in a roll shape while winding it back and supplies the film to a film forming unit to intermittently press-form a fine projections and depressions shape on the film surface.

Particularly, the present invention relates to an intermittent film forming system and an intermittent film forming method capable of reliably releasing a press-formed film from a mold and smoothly supplying the film to be subsequently pressed onto a mold surface.

BACKGROUND OF THE INVENTION

As a means for manufacturing an optical film such as light guide plate, light diffusion plate or lens, there is conventionally known a method to transfer a fine projections and depressions pattern to the surface of a film. For example, there has been proposed a system, which intermittently forms a fine projections and depressions pattern on a lengthy film wound in a roll shape, and a method thereof (Japanese Patent Application Kokai Publication No. 2005-199455 and Japanese Patent Application Kokai Publication No. 2005-310286).

In the above system and method, a film is supplied from a feed-out roll into a press unit, where the film is pressed onto a mold having a fine projections and depressions pattern and the pattern is transferred to form the projections and depressions pattern on the surface of the film. Before the film is pressed onto the mold to transfer the pattern, the mold is heated up to a temperature of a glass transit point of the film or higher. After completing the transfer, the mold is cooled down under a constant condition while keeping the press. When the mold is cooled down to the glass transit point of the film or lower, the pressure of the press is released and a certain tension is applied to the film thereby the film is released from the mold. However, this mold releasing method has a problem such that, depending on the characteristics of an applied resin or due to the wear of releasing agent applied on the mold surface, the film adheres to the mold and is hardly released therefrom. Also, there is another problem such that, when the film is forcibly pealed off from the mold, the mold surface may be damaged or stripping traces like scratches may be left on the surface of the film transferred with the pattern.

Also, there has been proposed another method in which a mold is previously formed with a warp, and at the same time when the pressure is released from the mold, a film formed with a pattern is automatically released due to its own elastic force (Japanese Patent Application Kokai Publication No. 2004-288845).

However, the above method has a problem such that, depending on its elastic characteristics, applicable molded article is limited. For example, in a case of a resin film of 0.3 mm or less in thickness, the method is not applicable thereto because the sufficient elastic force cannot be obtained.

On the other hand, although it is not a film forming system, there has been proposed a device for peeling off a film formed with a circuit pattern from a bonded backing plate as a device for peeling off a film adhered on a substrate surface (Japanese Patent Application Kokai Publication No. 2006-32400).

However, this above device is arranged so that a peeling member having a circular shape for holding the film at the end portion is rotated along a circular arc on the bonding surface to thereby release the film. However, since the device has a structure to hold the edge portion of film, the structure is not applicable to a continuous film wound in a roll shape. Also, the device is not applicable to a molding device such as a press because it is difficult to position the peeling member having a circular arc shape in a press-forming area.

Also, although it is not a film forming system, as a device for peeling off a stuck film, there has been proposed a device which peels off a film along a roll by rotating a roll on a sticking surface while holding film end portion (Japanese Patent Application Kokai Publication No. 2002-104726).

However, since the system proposed in Japanese Patent Application Kokai Publication No. 2002-104726 has a restriction such that the edge portion of the film has to be held same as the system proposed in Japanese Patent Application Kokai Publication No. 2006-32400, it cannot be applied to a continuous film having a roll shape.

DETAILED DESCRIPTION OF THE INVENTION

Aspects of the present invention have been proposed based on a result of intensive examination to solve one or more of the above problems. Exemplary embodiments of the present invention provide an intermittent film forming system that is capable of releasing a roll film from the surface of a mold disposed in a press unit without decreasing the quality of the pattern transferred surface of the film and the mold surface and/or capable of swiftly supplying new film to be subsequently pattern-transferred, and exemplary embodiments provide a intermittent film forming method.

A first embodiment of an intermittent film forming system according to aspects of the present invention for solving one or more of the above problems has an arrangement (1) described below.

(1) An intermittent film forming system, comprises at least: a mold having a fine projections and depressions shape formed on the surface thereof; a press for pressing a film to the surface of the mold; a transportation for carrying the film; and a releasing device for releasing the film from the surface of the mold, wherein said releasing device is provided at least with: a stripper roll for stripping the film; a means for rotary-driving the stripper roll; an auxiliary roll arranged substantially in parallel with the stripper roll across a film path line; a means for moving the auxiliary roll on the periphery of the stripper roll such that the film embraces the stripper roll; and a guide for moving said stripper roll and said auxiliary roll in the vicinity of the mold surface in parallel therewith while maintaining such a relative positional relationship that the film embraces the stripper roll.

In particular, a first embodiment of an intermittent film forming system according to aspects of the present invention is preferably any one of the followings (2) to (5).

(2) The intermittent film forming system set forth in the above (1) further comprising a means for moving said stripper roll in the vicinity of the surface in parallel therewith.

(3) The intermittent film forming system set forth in any of the above (1) and (2), wherein a film contact portion of said stripper roll surface is formed of rubber, rubber hardness is within a range of 40 to 70, and centerline average roughness on the surface is within a range of 0.01 to 1.0

(4) The intermittent film forming system set forth in any of the above (1) to (3), wherein a film contact portion of said auxiliary roll surface is formed of rubber, rubber hardness is within a range of 40 to 70, and centerline average roughness on the surface is within a range of 0.01 to 1.0 μm.

(5) The intermittent film forming system set forth in any of the above (1) to (4), wherein diameter of said stripper roll is within a range of 50 to 200 mm.

Also, a second embodiment of an intermittent film forming system according to aspects of the present invention for solving one or more of the above problems has an arrangement (6) described below.

(6) An intermittent film forming system, comprises at least: a mold having a fine projections and depressions shape formed on the surface thereof; a press for pressing a film to the surface of the mold; a transportation for carrying the film; and a releasing device for releasing the film from the surface of the mold, wherein said releasing device is provided at least with: a stripper roll freely rotatably held for releasing the film; an auxiliary roll arranged substantially in parallel with the stripper roll across a film path line; a means for moving the auxiliary roll on the periphery of the stripper roll such that the film embraces the stripper roll; a means for moving said stripper roll in the vicinity of said mold surface in parallel therewith; a guide for moving said stripper roll and said auxiliary roll in the vicinity of the mold surface in parallel therewith while maintaining such a relative positional relationship that the film embraces the stripper roll; and a mechanism for imparting a tension to the film on the downstream side from said stripper roll in a film carrying direction.

In particular, a second embodiment of an intermittent film forming system according to aspects of the present invention is preferably any one of the followings (7) to (14).

(7) The intermittent film forming system set forth in the above (6), wherein said mechanism for imparting a tension to the film employs a friction force between the surface of the auxiliary roll rotated by a means of rotary-driving and the surface of the film.

(8) The intermittent film forming system set forth in the above (6), wherein said auxiliary roll is freely rotatably held, and said mechanism for imparting a tension to the film is placed at the downstream side from the auxiliary roll in the film carrying direction.

(9) The intermittent film forming system set forth in any of the above (6) to (8), further comprising a means for detecting film tension disposed between said stripper roll and said mechanism for imparting a tension to the film, wherein tension imparting level of said means for imparting a tension to the film is controlled based on a value detected by the means for detecting film tension.

Further, in particular, an embodiment of a first or second intermittent film forming system according to aspects of the present invention is preferably any one of the followings (10) to (14).

(10) The intermittent film forming system set forth in any of the above (1) to (9), wherein the distance between said stripper roll and said mold surface at the time of film releasing is within a range of 0.1 to 10 mm.

(11) The intermittent film forming system set forth in any of the above (1) to (10) further comprising a means for controlling the temperature to heat and cool the mold.

(12) The intermittent film forming system set forth in any of the above (1) to (11) further comprising a means for imparting vibrations to the stripper roll.

(13) The intermittent film forming system set forth in any of the above (1) to (12) further comprising a means for controlling the temperature of the stripper roll to a substantially constant temperature.

(14) The intermittent film forming system set forth in any of the above (1) to (13) further comprising a means for controlling the temperature of the auxiliary roll to a substantially constant temperature.

For solving one or more of the above problems, embodiments of the intermittent film forming method according to aspects of the present invention includes any one of the followings steps (15), (16) and (17).

(15) A method of intermittently forming a film, comprising the steps of: intermittently supplying a film to the vicinity of a mold surface having a fine projections and depressions shape formed on the surface thereof; and then pressing the film to the mold to thereby form a fine projections and depressions shape on the film surface, wherein, after the film formation is completed, the method releases the film from the mold surface by moving both of a stripper roll and an auxiliary roll arranged substantially in parallel with each other from a film carrying downstream side to the upstream side in the vicinity of the mold surface substantially in parallel therewith, while rotating said both rolls, in a state that the film embraces said both rolls.

(16) A method of intermittently forming a film, comprising the steps of: intermittently supplying a film to the vicinity of a mold surface having a fine projections and depressions shape formed on the surface thereof; and then pressing the film to the mold to thereby form a fine projections and depressions shape on the film surface, wherein, after the film is formed and then released from the mold surface, the method intermittently supplies the film in the vicinity of said mold surface by moving both of a stripper roll and an auxiliary roll arranged substantially in parallel with the mold surface from a film carrying upstream side to the downstream side in the vicinity of the mold surface substantially in parallel therewith, while maintaining the relative positional relationship between said both rolls, in a state that said both rolls are stopped from rotating and the film embraces said both rolls.

(17) A method of intermittently forming a film, comprising the steps of: intermittently supplying a film to the vicinity of a mold surface having a fine projections and depressions shape formed on the surface thereof; and then pressing the film to the mold to thereby form a fine projections and depressions shape on the film surface, wherein, after the film formation is completed, the method releases the film from the mold surface by moving both of a stripper roll and an auxiliary roll arranged substantially in parallel with each other from a film carrying downstream side to the upstream side in the vicinity of the mold surface substantially in parallel therewith, while rotating said both rolls, in a state that the film embraces said both rolls, and subsequently the method intermittently supplies the film in the vicinity of said mold surface by moving said both rolls from the film carrying upstream side to the downstream side in the vicinity of the mold surface substantially in parallel therewith, while maintaining the relative positional relationship between said both rolls, in a state that said both rolls are stopped from rotating and the film embraces said both rolls.

Furthermore, embodiments of the intermittent film forming method according to aspects of the present invention set forth in any of the above (15) to (17) preferably includes the following step of (18) or (19).

(18) The method of intermittently forming a film set forth in any of the above (15) to (17), wherein when the film is released from the mold surface by movement of said stripper roll from the film carrying downstream side to the upstream side, said stripper roll is driven to rotate by following rotation.

(19) The method of intermittently forming a film set forth in any of the above (15) to (18), wherein when the film is intermittently supplied in the vicinity of the mold surface having the fine projections and depressions shape formed thereon, the film is supplied to the temperature controlled mold.

According to an intermittent film forming system and a forming method according to embodiments of the present invention, the film can be released reliably without generating any stripping traces and thereby a good film having a fine projections and depressions pattern formed on the surface thereof can be manufactured, as described below.

(i) According to a first intermittent film forming system of an embodiment of the present invention set forth in the above (1), the arrangement of the stripper roll and the auxiliary roll constantly ensures an upward stripping direction, and the means for rotary-driving the stripper roll generates a friction force between the stripper roll and the film. Therefore, a constant stripping force can be imparted to the film from a constant direction (stripping direction). Accordingly, the film can be reliably released without causing any stripping traces, and excellent film having a desired fine projections and depressions pattern formed on the surface thereof can be manufactured.

(ii) Particularly, according to a first intermittent film forming system of the embodiment of the present invention set forth in the above (2), the stripper roll is forcibly caused to perform straight movement and thus a constant stripping force can be more reliably applied thereto. Accordingly, the film can be reliably released without causing any stripping traces, and thus an excellent film having a desired fine projections and depressions pattern formed on the surface thereof can be manufactured.

(iii) Particularly, according to a first intermittent film forming system of the embodiments of the present invention set forth in the above (3) or (4), the surface conditions of the stripper roll and the auxiliary roll are prescribed to generate a stable friction force between the film and the rollers. Accordingly, the film can be reliably released without causing any stripping traces, and an excellent film having a desired fine projections and depressions pattern formed on the surface thereof can be manufactured.

(iv) Particularly, according to a first intermittent film forming system of the embodiment of the present invention set forth in the above (5), the diameter of the stripper roll is prescribed to a proper range. Thus, a contact area necessary for generating sufficient friction force between the film and the rolls can be ensured within a range in the practical system arrangement. Therefore, the film can be reliably released without causing any stripping traces, and an excellent film having a desired fine projections and depressions pattern formed on the surface thereof can be manufactured.

(v) Particularly, according to a second intermittent film forming system of the embodiment of the present invention set forth in the above (6), the arrangement of the stripper roll and the auxiliary roll ensures an upward stripping direction and the means for imparting a tension force constantly imparts a constant stripping force from a constant direction (stripping direction). Therefore, the film can be reliably released without causing any stripping traces, and an excellent film having a desired fine projections and depressions pattern formed on the surface thereof can be manufactured.

(vi) Particularly, according to a second intermittent film forming system of the embodiments of the present invention set forth in the above (7) or (8), a stable stripping force can be preferably obtained. Therefore, the film can be reliably released without causing any stripping traces, and an excellent film having a desired fine projections and depressions pattern formed on the surface thereof can be manufactured.

(vii) Particularly, according to a second intermittent film forming system of the embodiment of the present invention set forth in the above (9), the film tension can be precisely controlled and the film stripping force can be strictly controlled with a high precision. Therefore, more stable releasing operation can be achieved. Accordingly, an excellent film having a desired fine projections and depressions pattern formed on the surface thereof can be manufactured.

(viii) Particularly, according to a first or second intermittent film forming system of the embodiment of the present invention set forth in the above (10), the mold surface is prevented from being damaged and a constant stripping direction is maintained. Accordingly, the film can be released more stably and excellent film having a desired fine projections and depressions pattern formed on the surface thereof can be manufactured.

(ix) Particularly, according to a first or second intermittent film forming system of the embodiment of the present invention set forth in the above (11), the film of thermoplastic resin having a desired fine projections and depressions pattern precisely formed on the surface thereof can be manufactured.

(x) Particularly, according to a first or second intermittent film forming system of the embodiment of the present invention set forth in the above (12), the stripping force can be amplified. In such a condition the film is hardly released, by using this device, stable releasing operation can be achieved more smoothly. Therefore, an excellent film having a desired fine projections and depressions pattern formed on the surface thereof can be manufactured.

(xi) Particularly, according to a first or second intermittent film forming system of the embodiments of the present invention set forth in the above (13) or (14), since the film can be cooled immediately after being released, the pressed film can be carried and wound stably. Accordingly, the press-formed film having a pattern with little deformation caused by winding operation can be manufactured and wound in an excellent wound shape.

(xii) According to a method of intermittently forming the film of the embodiments of the present invention set forth in the above (15), (16) or (17), a stable stripping force can be imparted to the film. Accordingly, the film can be reliably released without causing any stripping traces, and an excellent film having a desired fine projections and depressions pattern formed on the surface thereof can be manufactured.

(xiii) Particularly, according to a method of intermittently forming the film of the embodiment of the present invention set forth in the above (18), stable releasing operation can be performed straightly by the stripper roll. Therefore, the film can be reliably released without causing any stripping traces and an excellent film having a desired fine projections and depressions pattern formed on the surface thereof can be manufactured.

(xiv) Particularly, according to a method of intermittently forming the film of the embodiment of the present invention set forth in the above (19), a film of thermoplastic resin having a desired fine projections and depressions pattern precisely formed on the surface thereof can be manufactured.

By using an above-described intermittent film forming system according to aspects of the present invention, a film having a fine projections and depressions pattern formed on the surface thereof by being pressed to the mold can be released from the mold in a short time without being damaged on the appearance thereof. At the same time, a film to which the pattern should be transferred can be supplied swiftly. Thus, a high quality pattern-formed film can be produced with a high efficiency.

By using an above-described method of intermittently forming the film according to aspects of the present invention, a film having a fine projections and depressions pattern formed on the surface thereof by being pressed to the mold can be released from the mold in a short time without being damaged on the appearance thereof. At the same time, a film, to which the pattern should be transferred, can be supplied swiftly. Thus, a high quality pattern-formed film can be produced with a high efficiency.

Furthermore, when implementing an intermittent film forming system and a method thereof according to aspects of the present invention, by using the temperature controlled mold, a film of thermoplastic resin having a fine projections and depressions pattern precisely formed on the surface thereof can be manufactured.

EXPLANATION OF REFERENCE NUMERALS

Figure 1:
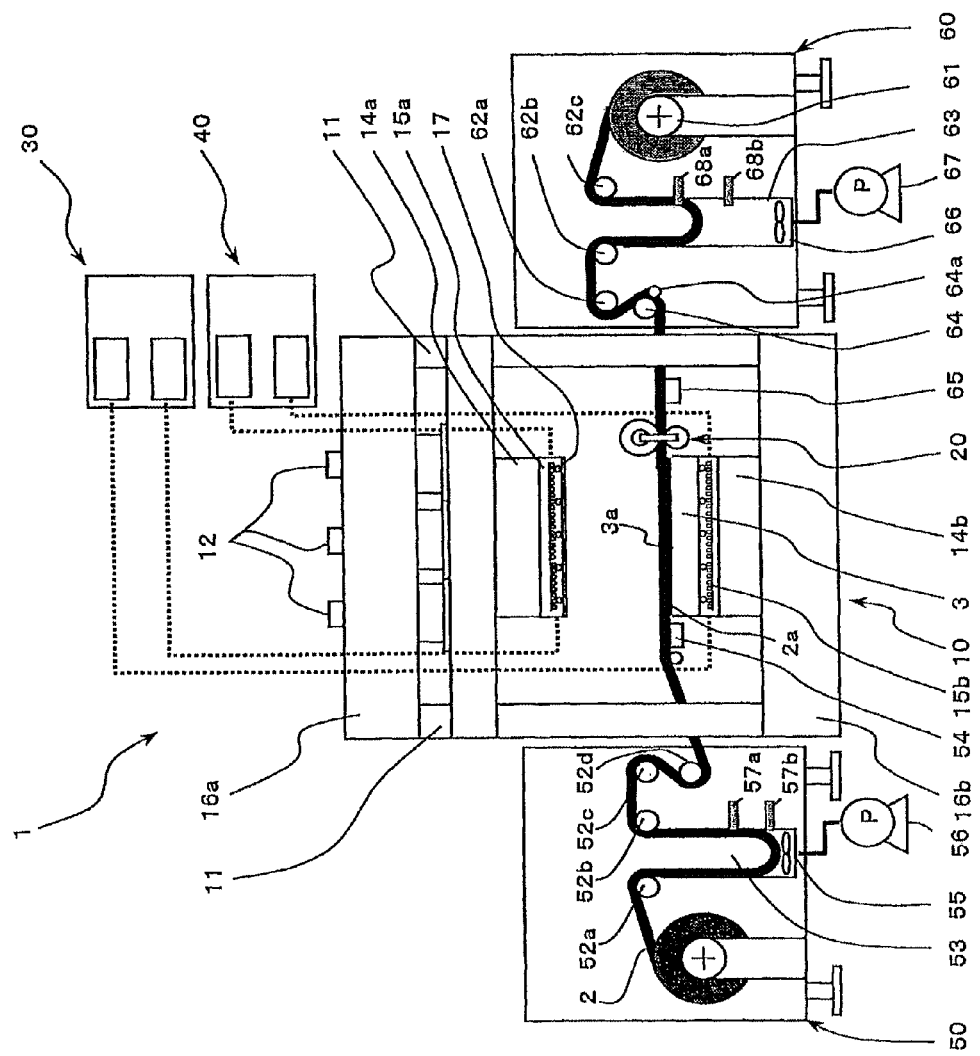
FIG. 1 is a schematic sectional view illustrating a first intermittent film forming system of an exemplary embodiment of the present invention as viewed from a film width direction.

1: a first intermittent film forming system of an embodiment of the present invention
2: film
3: mold
10: press unit
11: support post
12: press cylinder
13: vertical guide
14a, 14b: press plate (upper), (lower)
15a, 15b: temperature control plate (upper), (lower)
16: frame
17: elastic plate
20: releasing unit
21: stripper roll
22: auxiliary roll
22p: stand-by position
23: means for rotary driving stripper roll
24: means for circular moving auxiliary roll
25: guide for moving stripper roll
26: bracket
27: stripping point
30: heater unit
40: cooling unit
50: feeder unit
51: means for rotary driving feed roll
52a to 52d: guide roll
53: feed-out buffer
54: film fixing part
55: box
56: suction and exhaust means
57a, 57b: sensor
60: winding unit
61: means for rotary driving winding roll
62a to 62d: guide roll
63: winding buffer
64: drive roll for transportation
65: film fixing part
66: box
67: suction and exhaust means
68a, 68b: sensor
71: guide roll
72: tension detecting roll
73: means for detecting tension
H: clearance
101: a second intermittent film forming system of an embodiment of the present invention
120: releasing unit
121: stripper roll
122: auxiliary roll
122p: stand-by position
123: motor for directly driving stripper roll
124: means for circular moving auxiliary roll
125: guide for moving stripper roll
126: bracket
127: stripping point
128: ball screw
129: nut
A: feed-out side
B: winding side Preferred embodiments of the present invention will be described in detail below with reference to the drawings.

A first intermittent film forming system 1 of exemplary embodiments of the present invention is an intermittent film forming system that includes at least a mold having a fine projections and depressions shape formed on the surface thereof, a press for pressing the film to the surface of the mold, a temperature controller for heating and cooling the mold, a transportation for carrying the film, and a releasing device for releasing the film from the surface of the mold. The releasing device is equipped with at least a stripper roll for stripping the film, a means for driving the stripper roll for rotary-driving the stripper roll, an auxiliary roll arranged substantially in parallel with the stripper roll across a film path line therebetween, a means for moving the auxiliary roll around the stripper roll so that the film embraces the stripper roll, and a guide for moving the stripper roll and the auxiliary roll in parallel with the surface of the mold adjacent thereto while maintaining the relative positional relationship embracing the stripper roll with the film.

Figure 2:
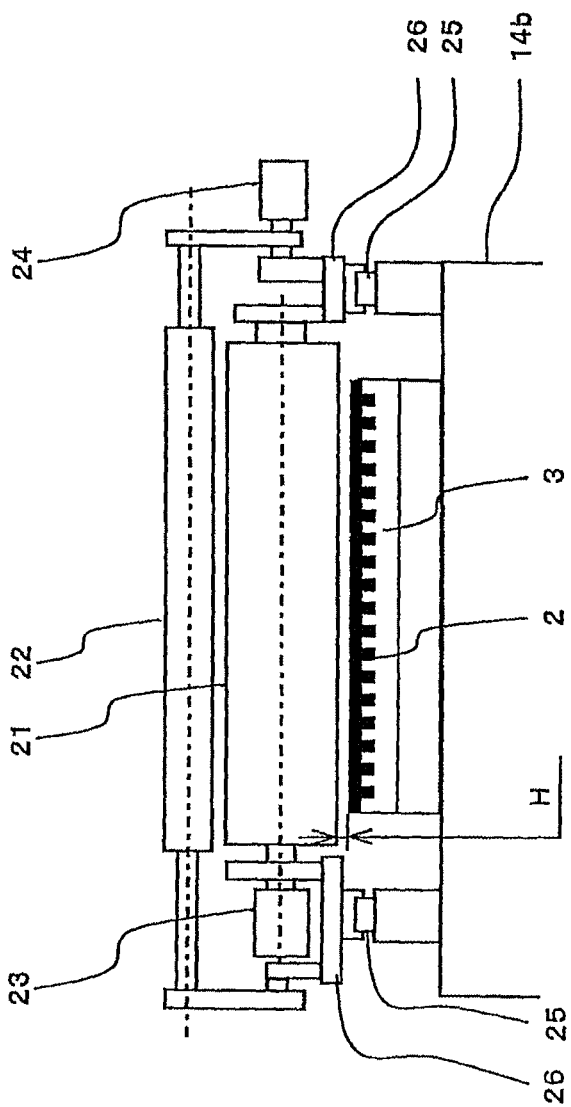
FIG. 2 is a schematic sectional view of a releasing unit of FIG. 1 as viewed from a film feed direction (winding side).

FIG. 1 is a schematic sectional view of a first intermittent film forming system 1 according to an exemplary embodiment of the present invention as viewed from a film width direction; FIG. 2 is a schematic sectional view of a releasing unit for releasing a film from a mold as viewed from a film feed direction (winding side); FIGS. 3(a) to 3(f) are schematic sectional views each illustrating a movement of the releasing unit.

As shown in FIG. 1, the first intermittent film forming system 1 of an exemplary embodiment of the present invention is composed of a press unit 10 as the above-mentioned press, a releasing unit 20 as the above-mentioned releasing device, a heater unit 30 as the above-mentioned temperature controller, a cooling unit 40 as the above-mentioned temperature controller, a feeder unit 50, and a winding unit 60. A film 2 wound in a roll shape on the feeder unit 50 is fed out therefrom, pressed to a surface 3a of a mold 3 having a fine projections and depressions shape thereon by the press unit 10 to transfer and form the fine projections and depressions pattern on a pattern-forming surface 2a of the film, and wound by the winding unit 60 thereon in a roll shape. The feeder unit 50 and the winding unit 60 are the above-mentioned film transportation. The feeding of the film and operation of transferring and forming of the fine projections and depressions pattern are repeated intermittently in order.

The press unit 10 is linked to press cylinders 12 so that a press plate (upper) 14a moves vertically along support posts 11 as a guide. The support posts 11 are disposed being sandwiched by a frame (upper) 16a and a frame (lower) 16b therebetween. The press plate (upper) 14a is provided with a temperature control plate (upper) 15a attached to the lower face thereof. On the other hand, the press plate (lower) 14b is provided with a temperature control plate (lower) 15b attached to the upper face thereof. Each of the temperature control plates is connected to the heater unit 30 and the cooling unit 40 via a piping, wiring or the like. The mold 3 is attached to the temperature control plate (lower) 15b on the upper surface thereof. The temperature control plate (lower) 15b controls the temperature of the mold 3 by heating/cooling the same. The mold 3 may be attached to the lower face of the temperature control plate (upper) 15a. The flatness of the film press surface of each plate is preferably 10 μm or less, more preferably 5 μm or less. The pattern forming processing is not limited to the heat forming method only. For example, a method using light may be employed. When the heat forming method is not employed, in the system and method of the present invention, the heater unit 30 and the cooling unit 40 as the temperature controllers are not necessary.

Each of the press cylinders is connected to a hydraulic pump and an oil tank (not shown). Vertical movement and pressing force of the press plate (upper) 14a is controlled through the hydraulic pump. In this embodiment, a hydraulic press cylinder is employed. However, if the pressing force can be controlled, any mechanism may be employed.

The pressure is preferably controlled within a range of 0.1 to 20 MPa, more preferably within 1 to 10 MPa.

The pressure increasing speed of the press cylinders is preferably controlled within a range of 0.01 to 1 MPa/s, more preferably 0.05 to 0.5 MPa/s.

The mold 3 used in exemplary embodiments of the present invention is described. The mold has a transferring surface having a fine pattern thereon. Any method like machining, laser processing, photolithography, electron beam machining or the like may be employed to form the pattern on the mold. The wording "fine projections and depressions shape" formed on the mold here means projective shapes of 10 nm to 1 mm in height, which are repeatedly formed at of 10 nm to 1 mm. More preferably, the height of the projective shapes is 1 to 100 μm at intervals of 1 to 100 μm. As the projective shape, projections having an arbitrary shape such as triangular pyramid, circular conic, square pole or lens-like shape are disposed discretely or as dots exemplified. Projections having sectional shapes of arbitrary shapes such as triangle, square, trapezoid, half circular and elliptic disposed in a stripe are exemplified. As the material for the mold, any material, which provides desired strength at pressing, machining accuracy of the patterns and film releasing performance, may be employed. For example, metal material including stainless, nickel, copper or the like, silicone, glass, ceramics or resin is preferably used. Alternatively, the above material having a surface covered with an organic film for facilitating the film releasing performance is preferably used. Fine projections and depressions pattern to be transferred to the film surface is formed on the mold.

In the case the temperature control plate is used, to form the film evenly entirely even when the thickness of the film is not even in thickness, an elastic plate 17 with heatproof temperature of 130° C. or more is preferably disposed between the temperature control plate (upper) 15a and the film 2. As the elastic plate 17, for example, ethylene propylene diene rubber (EPDM), silicone rubber, fluorine rubber or the like of 0.3 to 1.0 mm in thickness is preferably used. An elastic plate having the lubricated surface is more preferably used. The wording "heatproof temperature" here means a temperature at which the rate of change in tensile strength exceeds 10% after being exposed to ambient conditions at that temperature for 24 hours.

The releasing unit 20 as the above-mentioned releasing unit is described below. As illustrated in FIG. 2, the releasing unit is comprised of a stripper roll 21 and an auxiliary roll 22. The stripper roll 21 is connected with a means 23 for rotary driving the stripper roll to control the rotation to a specified number of rotations. As the means 23 for rotary driving the stripper roll, any means capable of controlling the number of rotation may be employed. A servomotor is more preferably employed for strictly controlling the number of rotations. The stripper roll 21 is linked with a pair of guides 25 for moving the stripper roll as the guide, so as to allow the stripper rolls 21 to rotate and move smoothly substantially in parallel with the surface of the mold 3 each being interposed by a bracket 26 as the above-mentioned guide. Each of the guides 25 for moving the stripper roll is attached to the upper face of the press plate (lower) 14b.

On the other hand, the auxiliary roll 22 is connected with a means 24 for circular moving the auxiliary roll as the above-mentioned means for moving the auxiliary roll, so as to allow the auxiliary roll 22 to move circularly along the outer surface of the stripper roll 21 at a stand-by position 22p shown in FIG. 3(a). As for the means 24 for circular moving the auxiliary roll, if the auxiliary roll can be driven to move vertically along the periphery around the stripper roll, any means such as an electromagnetic motor, an actuator using air pressure or the like may be employed. The both ends of the auxiliary roll are mounted to rotate freely about the roll shaft center. FIG. 2 shows a state that the auxiliary roll is moved to rotate up to a point generally above the top of the stripper roll 21 by the means 24 for circular moving the auxiliary roll.

Film contact portion of the stripper roll and the auxiliary roll is preferably formed of a rubber material having a specific elasticity and adhesiveness. For example, the rubber hardness (JIS K6253) is preferably 40 to 70, more preferably 50 to 60; and the centerline average roughness on the surface (JIS B0601) is preferably within a range of 0.01 to 1.0 μm, more preferably within a range of 0.01 to 0.5 μm. As an appropriate material, EPDM, silicone rubber, fluorine rubber or the like are available. When the rubber hardness on the respective rolls is larger than 70, or when the centerline average roughness is larger than 1 μm, close contact may not be obtained satisfactorily between the film and the roll causing a slip between the film and the roll at the time of film releasing. As a result, the stripping force may be reduced due to reduction of the film tension. On the other hand, when the rubber hardness is below 40, deformation of the rubber becomes larger at the time of film releasing causing an unstable releasing operation resulting in stripping traces on the film surface. Rolls with centerline average roughness smaller than 0.01 μm are difficult to manufacture.

Depending on the used film material and the temperature of the releasing operation, a proper tension applied to the film during releasing operation is preferably generally 1 to 100 N, more preferably 5 to 50 N. Since a high temperature film is handled, a material with heatproof temperature of 100° C. or more, more preferably 130° C. or more is preferably used for the surface material of the respective rolls to prevent a failure of releasing operation caused from temporal dimensional changes and/or decrease of strength. Here, the wording of "heatproof temperature" is as defined above.

The operation to release the film from the mold surface and to feed a new film to be pattern-formed is described below with reference to FIG. 2 and FIG. 3.

Figure 3:
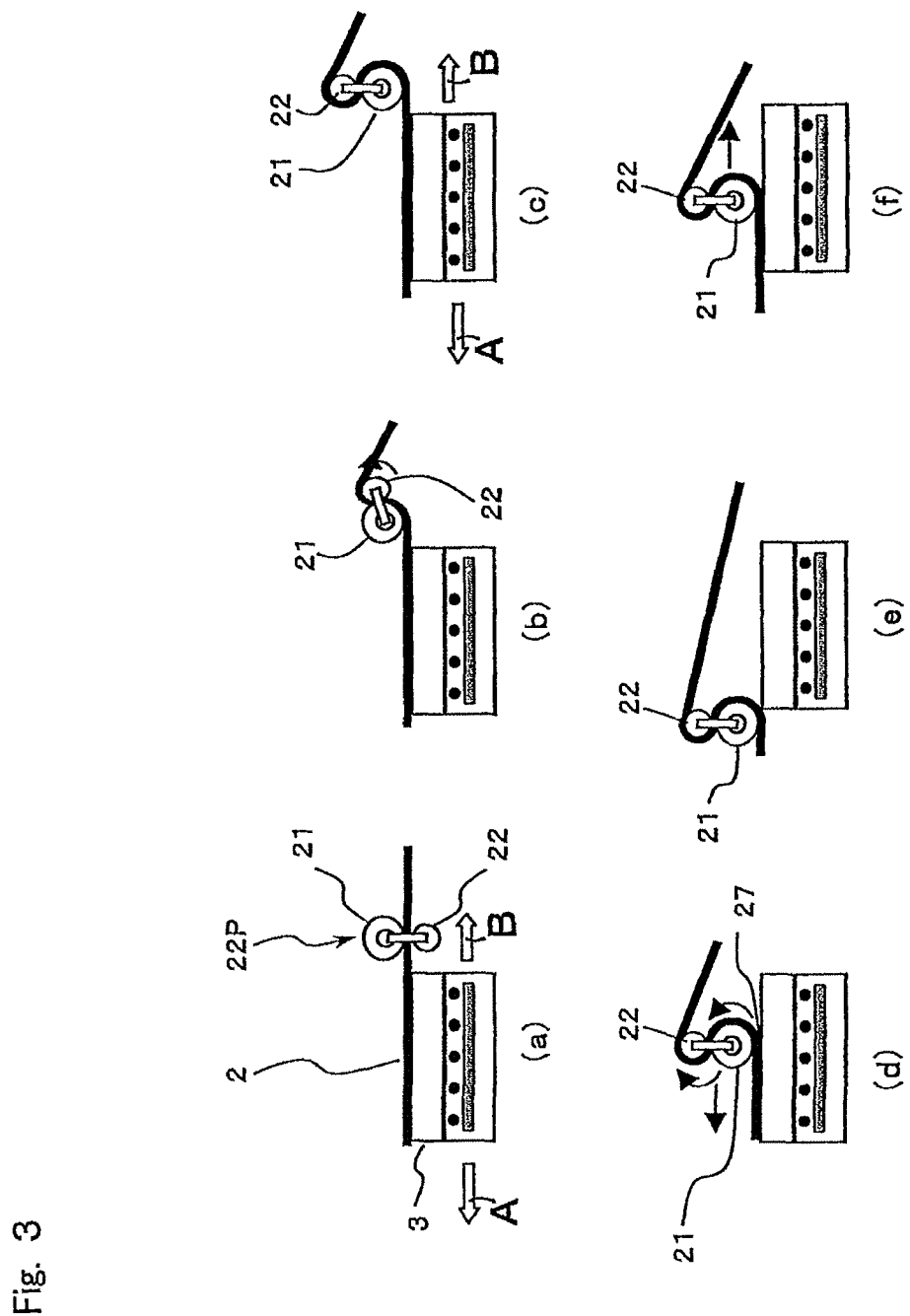
FIG. 3 is a schematic sectional view of a movement of the releasing unit of FIG. 1 as viewed from a film width direction.

According to exemplary embodiments, before beginning the releasing operation, the releasing unit stands by at a stand-by position 22*p* shown in FIG. 3(*a*). In FIG. 3, arrow-A indicates the feeding side; and arrow-B indicates the winding side. When the releasing operation is started, the means for circular moving the auxiliary roll is driven to move the auxiliary roll 22 up to generally top of the stripper roll 21 as shown in FIGS. 3(*b*) and 3(*c*). After that, the stripper roll is rotated by the means 23 for rotary driving the stripper roll as shown in FIG. 3(*d*). The stripper roll rotates and moves straightly toward the film feeding side along the surface of the mold 3, and thus releases the film from the mold in a state that the film while allowing the stripper roll to embrace the film stuck to the mold. When the film is entirely released from the mold as shown in FIG. 3(*e*), a drive roll for transportation, which is located at the downstream side, is rotated to pull the film while activating a brake so as to prevent the stripper roll from rotating. Then, the unit of the stripper roll and the auxiliary roll moves straightly toward the film winding side in a state that the film embraces the stripper roll and the auxiliary roll as shown in FIG. 3(*f*). The above-described straight movement is performed along the pair of the guides 25 for moving the stripper roll.

That is, the guide 25 for moving the stripper roll as the above-mentioned guide has a function to allow the stripper roll and the auxiliary roll to move reciprocally in parallel with the mold surface in the vicinity thereof while holding the relative positional relationship that the film embraces the stripper roll (FIGS. 3(*c*) to 3 (*f*)).

When the stripper roll returns to the end position at the winding side, the auxiliary roll is moved down to a position generally beneath the stripper roll by the means for circular moving the auxiliary roll and the film is released. Although the above releasing operation depends on the rotation speed of the stripper roll, the film is released at generally same speed as the peripheral speed of the roll. Therefore, the releasing operation can be precisely controlled and conditions required for smooth releasing operation can be easily generated for any forming material and condition.

Another embodiment of the releasing device is described. In addition to the above-described arrangement, a means for directly driving the release roll such as a linear motor, electromagnetic cylinder or pneumatic cylinder is linked to the stripper roll. When releasing the film, while maintaining a constant torque with a means for rotary driving the stripper roll, the means for directly moving the release roll is driven to move the releasing device toward the feed-out side to thereby release the film. After completing the releasing operation, in a state the rotation of the stripper roll is stopped as described above, the drive roll for transportation, which is positioned at the downstream side, is rotated to pull the film.

At the time of film releasing, the stripper roll and the mold surface may be brought into contact with each other. In this case, elastic members such as air cylinder or spring are preferably disposed in the vicinity of the both ends of the stripper roll in the film width direction to thereby control the pressing force of the stripper roll to the mold surface.

Further, when the projections and depressions pattern on the mold surface is extremely minute and easily gets damage due to a contact with the stripper roll, a distance (clearance) H between the stripper roll and the mold surface shown in FIG. 2 is preferably 0.1 to 10 mm, more preferably 0.1 to 5 mm, further preferably 0.1 to 1.0 mm.

When the clearance H is set to below 10 mm, film stripping point 27 (refer to FIG. 3(*d*)) is located immediately beneath the stripper roll, and when the stripper roll moves, the stripping point 27 also preferably moves continuously. Contrarily, when the clearance H is set to be larger and the film is released at a high speed, the stripping point 27 may intermittently stop or move toward the feed-out side at a speed larger than the peripheral speed of the stripper roll causing a linear stripping trace in a width direction of the film at the stop point. A preferred value of the clearance H preferably has a range of 0.1 to 10 mm for smoothly releasing operation of the film. When the clearance H is below 0.1 mm, the mold surface and the stripper roll may come into contact with each other, and the pattern shape of the mold may get damaged adversely. Contrarily, when the clearance H is set to be above 10 mm, as the releasing speed is increased, intermittent releasing operation adversely causes stripping traces on the pattern formed surface. The parallelism between the stripper roll and the mold surface is preferably 0.5 mm or less, more preferably 0.1 mm or less. Here, displacement sensors, which are mounted at the both sides in the film width direction, measure the parallelism from the mold surface as the reference. That is, the wording "parallelism" means a difference between the mold surface and the roll peripheral surface, which is measured at the both ends when the stripper roll is positioned immediately above the displacement sensor.

The stripper roll and the auxiliary roll are preferably provided with a cooling water circulation mechanism or the like to control the temperature of the respective rolls to a constant level. Immediately after the film is released from the mold, the film has a high temperature. Therefore, the stripper roll and the auxiliary roll, which come into contact with the film immediately after the film is released from the mold, are preferably controlled to a constant temperature. The stripper roll and the auxiliary roll have such an effect to reduce the temperature of the film during the releasing operation and immediately after the release from the mold. Further, cooling of the stripper roll and the auxiliary roll is effective for stable carrying and winding of the film after press-forming operation.

Furthermore, the stripper roll is preferably provided with a vibration means that causes the stripper roll to generate minute vibrations in a lateral direction. The vibration means may employ an electromagnetic actuator, linear actuator or ultrasonic transducer. Alternatively, such a mechanism that causes the peripheral surface only of the stripper roll to generate vibrations may be employed. The vibrations of the stripper roll or peripheral surface thereof propagate to the stripping point via the film embracing therearound and facilitate the release of the film.

To achieve stable releasing operation, an appropriate friction force necessary for releasing the film is preferably generated between the stripper roll and the film. For this purpose, the contact length between the film and the stripper roll in the film feed direction is preferably set to a range of 30 to 300 mm. To create the above contact condition in the system of the present invention, the diameter of the stripper roll is preferably set to a range of 50 to 200 mm. When the diameter of the stripper roll is below 50 mm, the contact area between the stripper roll and the film is too small to generate satisfactory friction force between the contact surfaces. Therefore, satisfactory stripping force cannot be generated and the stripper roll may adversely slip. Further, when the diameter of the stripper roll is below 50 mm, the curvature is too large for the film immediately after being released from the mold to follow the configuration of the stripper roll. The film may curl or deform. Contrarily, when the diameter of the stripper roll is more than 200 mm, a space necessary for releasing operation is hardly ensured within the press unit in an aspect of designing.

The heater unit 30 according to exemplary embodiments is described below. In the heater unit 30, temperature control plates (upper) and (lower) 15a, 15b are preferably made of aluminum alloy, and an electric heater is embedded in the respective plates for controlling the temperature. Alternatively, copper or stainless pipe arrangement embedded in the respective temperature control plates, the plates may be machined to form bores therein and heat controlled medium may be flowed therethrough to heat and control the temperature. Further, a combination of the above may be employed.

As for the heat transfer medium, BARELL THERM (MATSUMURA OIL CO., LTD.) and NeoSK-OIL (Soken Technics Co., Ltd.) or the like are available. In addition, water heated to 100° C. or more may be circulated. Reynolds number within the piping is preferably set to a range of $1.0 \times 10^4$ to $12 \times 10^4$ for efficient heat transfer.

When an embedded heater or cartridge heater is employed, the temperature control plates are preferably divided into several portions so as to locally control the temperature.

In any stage of the raising the temperature, lowering or maintaining the temperature at a constant level, the temperature distribution on the temperature control plates is preferably controlled within a range of 10° C., more preferably 5° C.

The mold may be arranged to have a heat medium piping to directly control the temperature thereof.

The cooling unit 40 according to exemplary embodiments is described below. The cooling unit includes a copper or stainless pipe arrangement embedded in each of the temperature control plates (upper) and (lower) 15a, 15b, or bores may be machined therein for allowing a cooling medium of controlled temperature to flow therethrough to thereby control cooling of the plates.

As for the cooling medium, although water is the fittest, a solution of ethylene glycol may be used. The temperature is preferably controlled within a range of 10 to 50° C. Reynolds number within the piping is preferably set to be within a range of $1.0 \times 10^4$ to $12 \times 10^4$ to facilitate heat transfer.

The feeder unit 50, winding unit 60 according to exemplary embodiments as the above-mentioned film transportation is described below. The feeder unit 50 is composed of a means 51 for rotating the feed-out roll, carrying rolls 52a to 52d, a feed-out buffer 53 and a film fixing part 54. The winding unit 60 is composed of a means 61 for rotating winding roll, carrying rolls 62a to 62d, a winding buffer 63, a drive roll for transportation 64 and a film fixing part 65.

Each of the feed-out buffer 53 and the winding buffer 63 is composed of a box 55, 66 and a suction and exhaust means 56, 67 connected thereto respectively. As for the suction and exhaust means 56, 67, any means like vacuum pump, which sucks and exhausts the air, may be employed. By exhausting the air from the box, a pressure difference is generated at the front side and the rear side of the film inserted in the box. The film is held while a specific tension is applied to the film and a warp is generated on the film within the box. Appropriate length of the film inserted in the box is a length of the film, which is intermittently carried before and after forming the pattern on the film. Sensors 57a, 57b, 68a and 68b are provided within the respective boxes 55, 66. Any type of sensors, which are capable of detecting the film at the respective positions, may be employed. After the film is released from the mold by the mold releasing device and carried and when the film is out of detection position of the sensors within the boxes, the means 51 for rotating the feed-out roll, which is located at the upstream side or the means 61 for rotating the winding roll, which is located at the down stream side, is activated to feed out or wind the film. Thus, the warp of the film is maintained at the specified position within the box.

As for the film fixing parts 54 and 65, a plane plate with the surface having suction holes formed thereon, is preferably employed. Any mechanism that holds the film with clips, or a combination of the above, may be employed.

When performing the press operation, both of the film fixing parts 54 and 65 are activated. When releasing the film from the mold, the film fixing part 54 is activated to fix the film and the film fixing part 65 is preferably released. When supplying the film, preferably, both of the film fixing parts 54 and 65 are released.

The drive roll for transportation 64 is linked to a spin-drive means like a motor (not shown). When carrying the film, a nip roll 64a comes into contact with the drive roll for transportation 64 to nip the film. The drive roll for transportation 64 carries the film under a constant tension while controlling a torque.

Figure 4:
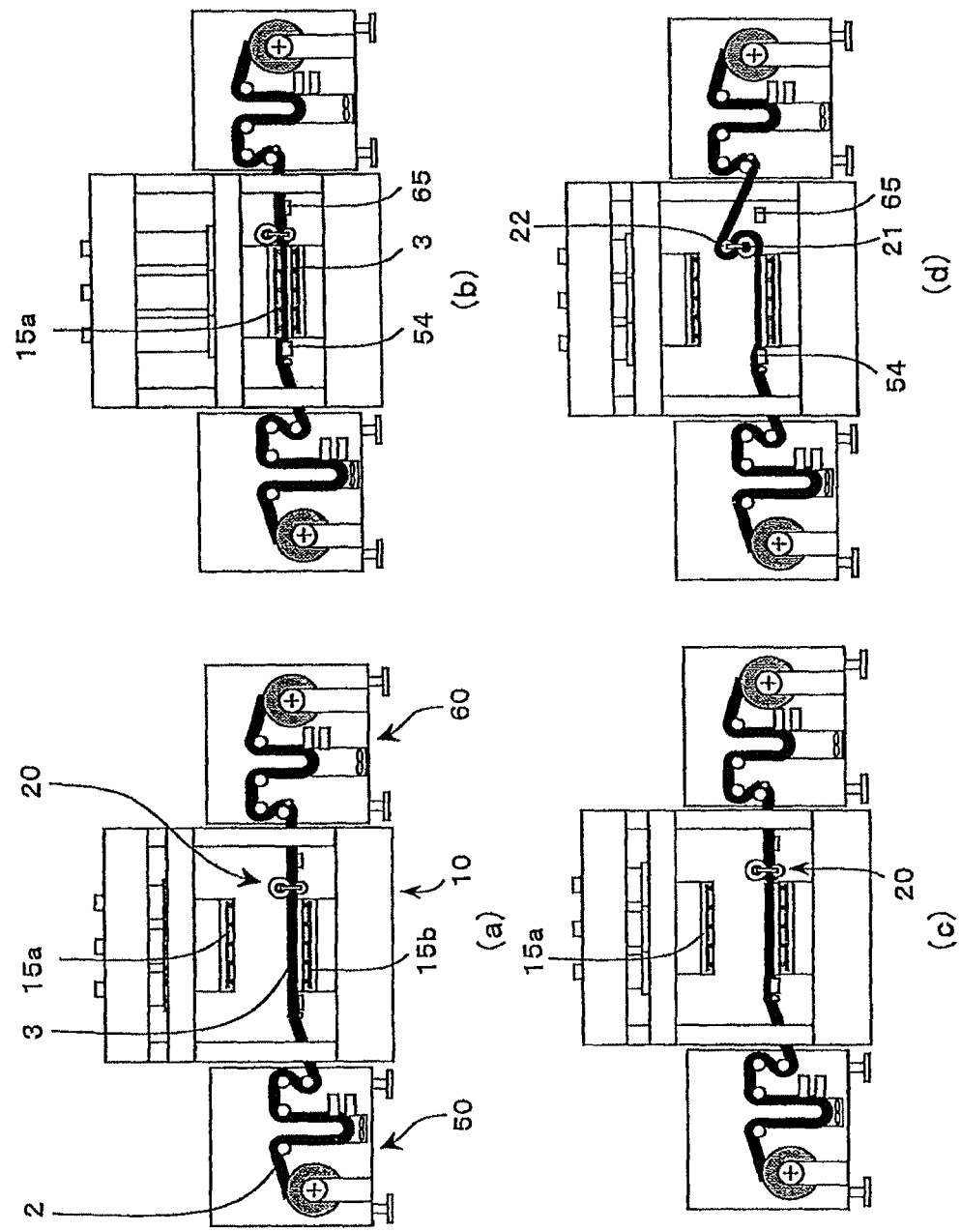
FIG. 4 is a sectional view of FIG. 1 as viewed from the film width direction schematically illustrating the process of an intermittent film forming method.
Figure 5:
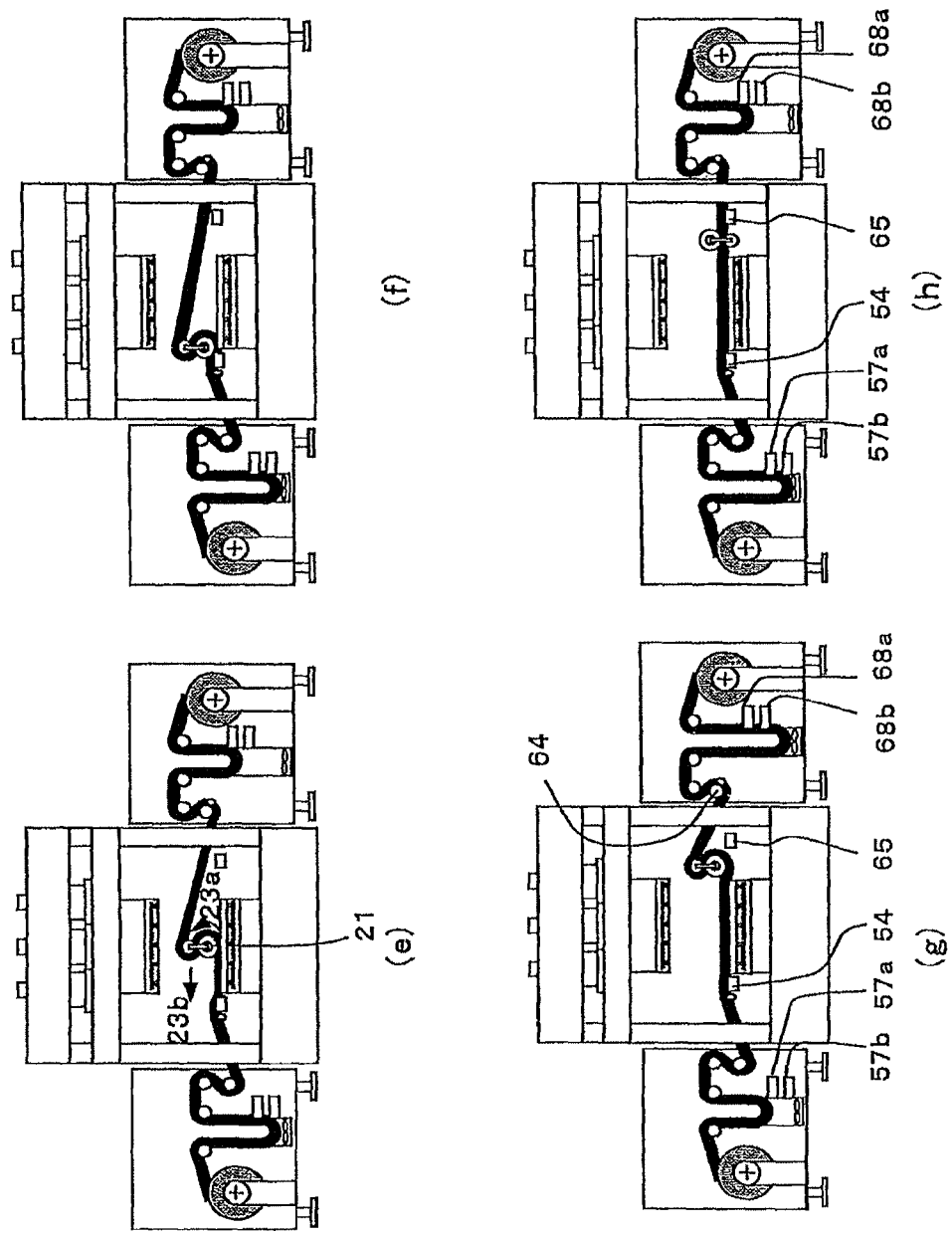
FIG. 5 is a sectional view of FIG. 1 as viewed from the film width direction schematically illustrating the process of an intermittent film forming method.

A sequence of film forming operation by a first intermittent film forming system 1 of exemplary embodiments of the present invention will be described below. FIG. 4 and FIG. 5 are schematic sectional views illustrating the operation of intermittently forming a roll-shaped continuous film using the system of exemplary embodiments of the present invention as viewed from the film width direction. The film is preferably formed in the sequence of processes (A) to (K) as described below.

(A) After setting the mold 3 on to the press unit 10 beforehand, the film 2 is set on the feeder unit 50. The front end of the film 2 is pulled out, and through the guide rolls, the film is set on the surface of the mold in the press unit therealong. Further, the film is wound on the winding unit 60 through the mold releasing unit 20 (refer to FIG. 4(a)).

(B) Then, the heater unit is activated to increase the temperature of the temperature control plates (upper) (lower) 15a and 15b to a film forming temperature.

(C) The press unit 10 is activated, and the temperature control plate (upper) 15a is lowered. The film is sandwiched by the surface of the mold 3 and the temperature control plate (upper) therebetween and pressed thereby. At this time, the film fixing parts 54 and 65 are activated to fix the film. The conditions such as temperature, pressing pressure, pressure increasing speed and the like depend on material of the film, configuration of the pattern to be transferred, particularly the aspect ratio of the projections and depressions. Generally, the forming temperature is set to 100 to 180° C., the pressing pressure is set to 1 to 10 MPa, the forming time is set to 1 to 60 seconds, and the pressure increasing speed is set to a range of 0.05 to 1 MPa/s (refer to FIG. 4(b)).

(D) After completing the heat-pressing, the cooling unit is activated to lower the temperature of the temperature control plates (upper), (lower) 15a and 15b. During cooling, the press is preferably continued. The cooling temperature is set to a temperature of the mold surface at which the film is cooled enough to be released from the mold. For example, the surface temperature of the mold 3 is preferably cooled down to a glass transit point or less of the film.

(E) After completing the cooling operation, the pressure is released. Then, the temperature control plate (upper) 15a is raised up to a position where a space enough for moving the mold releasing unit 20 horizontally within the press unit (refer to FIG. 4(c)).

(F) After the temperature of the temperature control plate (upper) 15a has been raised, the film fixing part 65 is released. Then, the means for circular moving the auxiliary roll is activated, and the auxiliary roll 22 is caused to move to the top of the stripper roll 21 so that the film 2 embraces the stripper roll 21 and the auxiliary roll 22 (refer to FIG. 4(d)).

(G) After that, the stripper roll 21 is caused to rotate on the film surface in a direction 23a. The stripper roll 21 moves in a direction 23b while rotating due to the friction force with the film surface. The stripper roll 21 moves being guided by a stripper roll direct moving guide attached in the press plate of the press. Thus, the film in close contact with the mold surface is reliably released therefrom (refer to FIG. 5(e)).

(H) After completing releasing the film from the mold to the end at the feed-out side of the mold 3, the stripper roll is stopped from rotating (refer to FIG. 5(f)).

(I) After that, while the stripper roll is applied with a brake so as not to rotate, the film fixing part 54 is released and the drive roll for transportation 64 is driven to rotate. Whereby, the stripper roll 21 and the auxiliary roll 22 move toward the winding side while maintaining the relative position therebetween. At this time, new film is pulled out from the feed-out side and the pattern-formed film is carried to the winding side (refer to FIG. 5(g)).

(J) When the film has been pulled out, the film fixing part 54 fixes the film. Then, the auxiliary roll is driven to move circularly and return to the previous position, and the film fixing part 65 fixes the film. When new film is supplied, the film, which is fed to form a warp in the feed-out buffer 53, is pulled out toward the winding side. A means for rotating the feed roll is activated until the film is detected by the sensor 57b, and thus new film is supplied to the feed-out buffer from the feed out roll. On the other hand, when the pattern-formed film is carried, the film of a length equivalent to the length of the carried film is temporally held in the winding buffer 63. A means for rotating the winding roll is activated until the film is not detected by the sensor 68a; i.e., the film of a length equivalent to the length of the held film is wound (refer to FIG. 5(h)).

(K) At the same time when the film has been released or immediately before that, heating of the temperature control plates (upper) (lower) is started. Then, the press unit 10 is activated to lower the temperature control plate (upper) to the vicinity of the upper face of the film.

After raising the temperature to a predetermined level, the press formation is carried out, and the above-described operations are repeated from step (C).

By performing the above-described operations from step (F) to step (H), the releasing operation can be incorporated smoothly into the intermittent film forming cycle and a high quality pattern formed film having little stripping traces can be manufactured.

By performing the operation of the above step (I), the film to be formed in the next cycle can be swiftly supplied to the press unit. Therefore, the intermittent film forming operation can be carried out with high productivity. By combining the above releasing operations and supplying operation, a high quality pattern formed film can be produced with high productivity.

A second intermittent film forming system 101 according to exemplary embodiments of the present invention will be described below with reference to the drawings.

A second intermittent film forming system 101 according to exemplary embodiments of the present invention is an intermittent film forming system that includes at least a mold having a fine projections and depressions shape formed on the surface thereof, a press for pressing a film to the surface of the mold, a transportation for carrying the film, and a releasing device for releasing the film from the surface of the mold. The releasing device is equipped with at least stripper roll that is freely rotatably held for stripping the film, an auxiliary roll that is disposed substantially in parallel with the stripper roll across a film path line therebetween, a means for moving the auxiliary roll to move the auxiliary roll around the stripper roll so that the film embraces the stripper roll, a drive means for moving the stripper roll in parallel with the mold surface in the vicinity thereof, a guide for moving the stripper roll and the auxiliary roll in parallel with the mold surface in the vicinity thereof while holding a relative positional relationship that the film embraces the stripper roll, and a means for imparting a tension to the film in the downstream side from the stripper roll in a film carrying direction.

Figure 6:
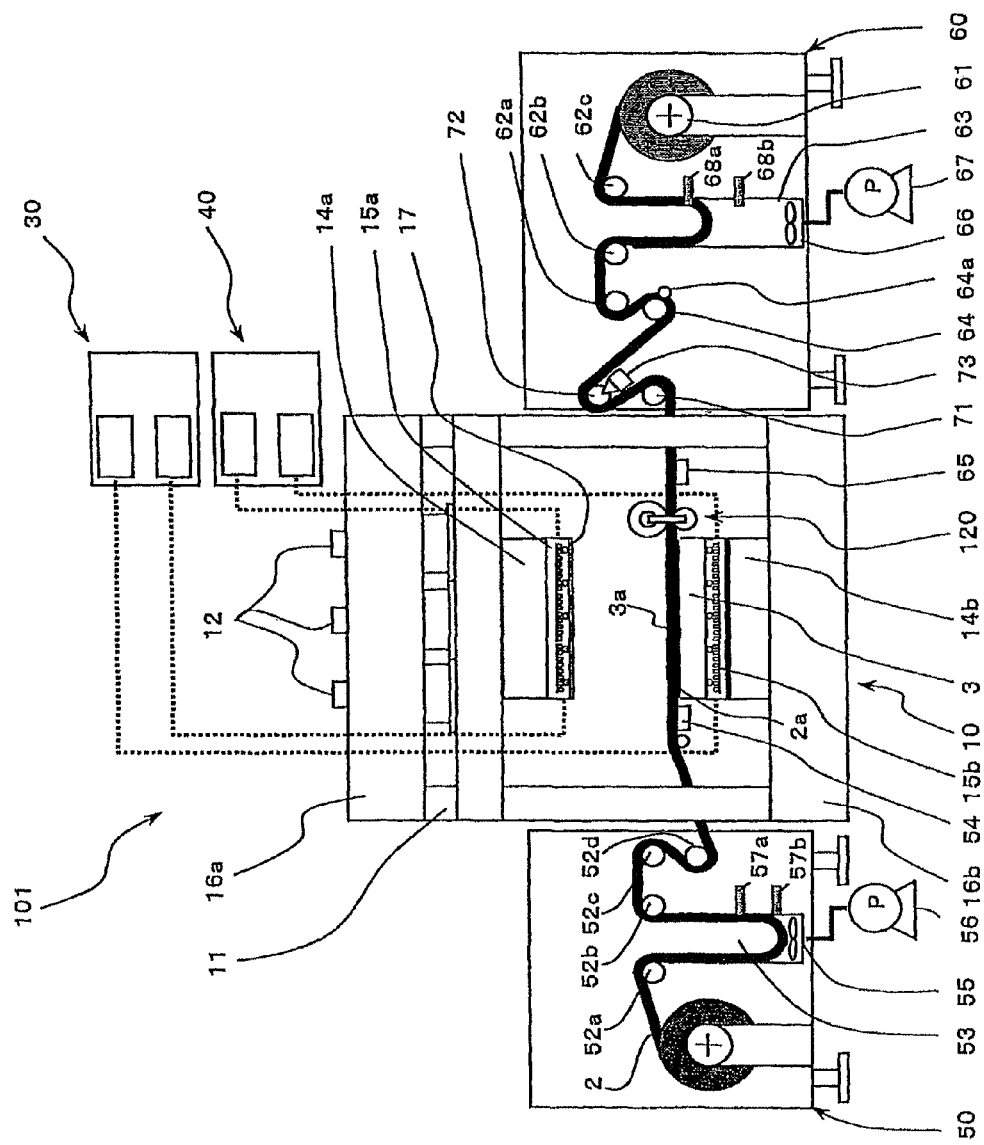
FIG. 6 is a schematic sectional view of a second intermittent film forming system of an exemplary embodiment of the present invention as viewed from a film width direction.

As shown in FIG. 6, a second intermittent film forming system 101 according to exemplary embodiments of the present invention is composed of a press unit 10 as the above-mentioned press, a releasing unit 120 as the above-mentioned releasing device, a heater unit 30 as the above-mentioned temperature controller, a cooling unit 40 as the above-mentioned temperature controller, a feeder unit 50, and a winding unit 60. The film 2 wound in a roll shape is fed out in order from the feeder unit 50, pressed to a surface 3a of the mold 3 having the fine projections and depressions shape by the press unit 10; thereby the fine projections and depressions pattern is transferred to the pattern-forming surface 2a of the film, and wound by the winding unit 60 into a roll shape. The feeder unit 50 and the winding unit 60 are the above-mentioned film transportation. The winding and pattern transfer operation is intermittently repeated in order.

Since the constitution excluding the releasing unit 120 is substantially identical to that of the above-describe first intermittent film forming system of exemplary embodiments of the present invention, the description thereof is omitted.

Figure 7:
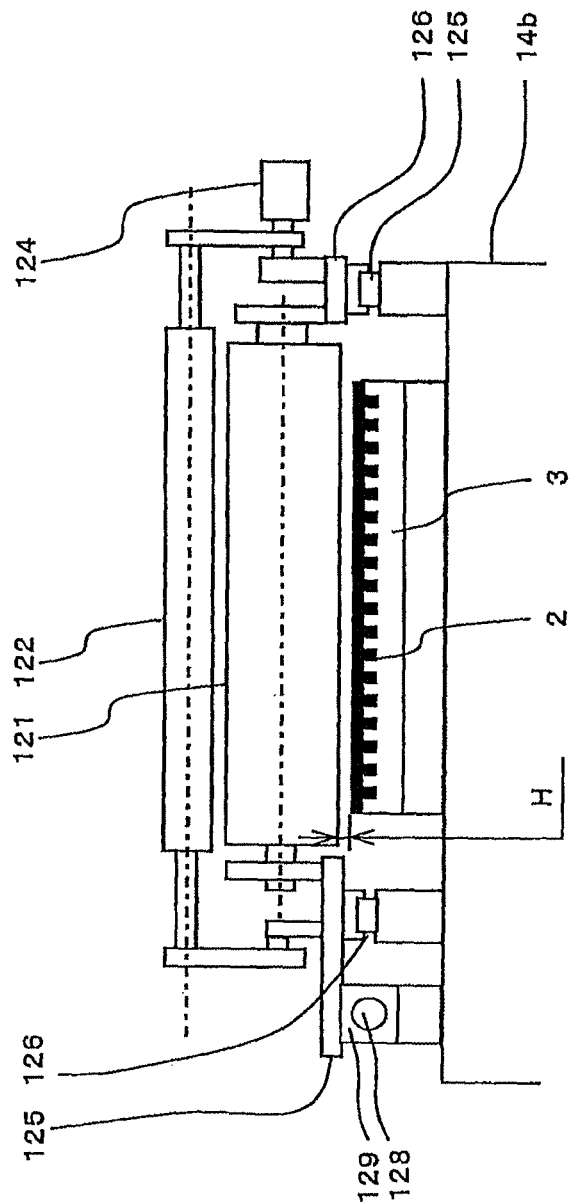
FIG. 7 is a schematic sectional view of a releasing unit in FIG. 6 as viewed from a film feed direction (winding side).

The releasing unit 120 as the releasing device according to exemplary embodiments is described. As shown in FIG. 6 and FIG. 7, the releasing device is composed of a stripper roll 121 and an auxiliary roll 122. The stripper roll 121 is freely rotatably held by a means for holding the stripper roll, and is arranged to rotate by following rotation when the stripper roll 121 is driven to move by a direct drive motor 123. If the means for holding the stripper roll can be held capable of being driven to rotate by following rotation, any means may be employed. The stripper roll 121 is linked with a stripper roll direct moving guide 125 as the above-mentioned guide via a bracket 126 so as to be driven to move smoothly substantially in parallel with the surface of the mold 3, while which is rotated by following rotation. The stripper roll direct moving guide 125 is attached to the upper face of the press plate (lower) 14b.

On the other hand, as shown in FIG. 7, the auxiliary roll 122 is connected to a means 124 for circular moving the auxiliary roll as the means for moving the auxiliary roll so as to move circularly along the peripheral surface of the stripper roll 121 at a stand-by position 122p shown in FIG. 8(a). As for the means 124 for circular moving the auxiliary roll, if the auxiliary roll can be driven to move vertically around the stripper roll along the periphery thereof, any type of means such as an electromagnetic motor or actuator using air pressure may be employed. The both ends of the auxiliary roll are attached so as to rotate freely about the roll shaft center. FIG. 7 illustrates a state that the auxiliary roll is driven to move up to a point generally above the stripper roll 121 by the means 124 for circular moving the auxiliary roll.

At the downstream side from the stripper roll 121 in a film carrying direction, a means for appropriately imparting a tension to the film is disposed. For example, the means for imparting a tension to the film is preferably composed of a drive roll for transportation 64, a guide roll 71, a tension detector roll 72 or a tension detecting means 73 as shown in FIG. 6. Particularly, by arranging as described above, the tension imparting level of the means for imparting a tension to the film is preferably controlled by the drive roll for transportation 64 based on the value detected by the means 73 for detecting film tension.

Each film contact portion of the stripper roll and the auxiliary roll is preferably formed of a rubber material having a specific elasticity and adhesion. For example, the rubber hardness (JIS K6253) is preferably 40 to 80, more preferably 50 to 80; and the centerline average roughness on the surface (JIS B0601) is preferably within a range of 0.01 to 50 μm, more preferably within a range of 0.01 to 30 μm. As an appropriate materials, EPDM, silicone rubber, fluorine rubber or the like are available. When the rubber hardness on the respective rolls is larger than 80, or when the centerline average roughness is larger than 50 μm, close contact between the film and the roll is not ensured. On the other hand, when the degree of hardness of the rubber is 40 or less, deformation of the rubber becomes larger at the time of releasing operation. As a result, the releasing operation becomes unstable resulting in stripping traces in the film surface. Rolls with centerline average roughness smaller than 0.01 μm are difficult to manufacture.

Depending on the film material used and, in case of heat forming, depending on the temperature of the releasing operation, a proper tension applied to the film during releasing operation is, preferably, generally 1 to 100 N, more preferably 5 to 50 N. Since a high temperature film is handled, in order to prevent a failure of releasing operation due to temporal dimensional changes and/or decrease of strength, a material with heatproof temperature of 100° C. or more, more preferably 130° C. or more is preferably used for the surface material of the respective rolls. Here, the wording of "heatproof temperature" has been defined above.

The operation to release the film from the mold surface and to feed new film to be pattern formed, according to exemplary embodiments, is described below with reference to FIG. 7 and FIG. 8.

Figure 8:
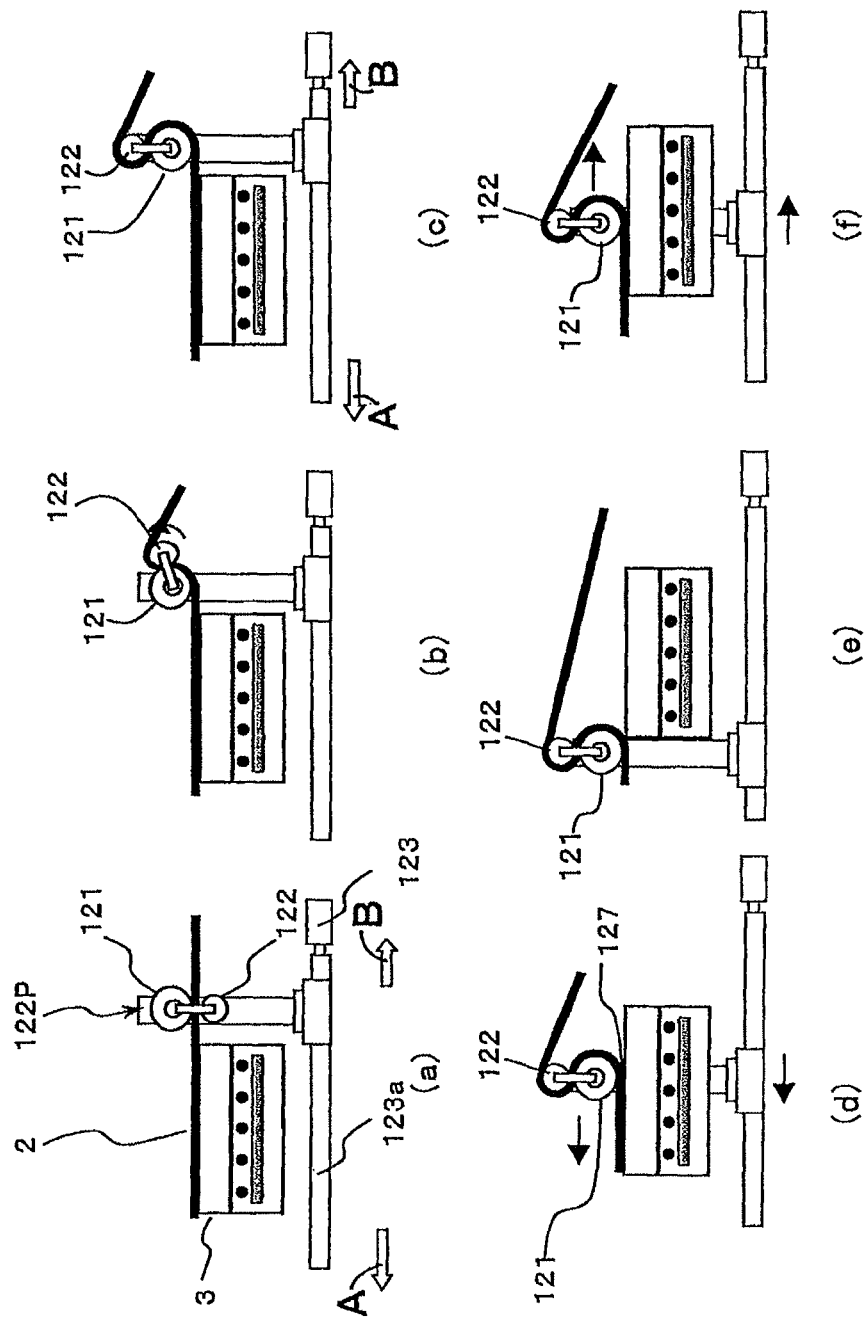
FIG. 8 is a schematic sectional view illustrating the operation of the releasing unit in FIG. 6 as viewed from the film width direction.

Before beginning the releasing operation, the releasing unit preferably stands by at the stand-by position 122p shown in FIG. 8(a). In FIG. 8, arrow-A indicates the feeding side; and arrow-B indicates the winding side. When the releasing operation is started, the means for circular moving the auxiliary roll is activated to move the auxiliary roll 122 up to generally top of the stripper roll 121 as shown in FIGS. 8(b) and 8(c). After that, a motor 123 for directly moving the stripper roll is activated to move the stripper roll toward the feed-out side as shown in FIG. 8(d). At the same time, a tension is applied to the film by a drive roll for transportation 64 located at the downstream side. The stripper roll proceeds straightly and is rotated on the surface of the mold 3 to thereby release the film from the mold in a state that the film embraces the stripper roll. When the film is released entirely from the mold as shown in FIG. 8(e), the motor 123 for directly moving the releasing roll is activated to move the stripper roll 121 straightly toward the winding side as shown in FIG. 8(f). At this time, the stripper roll is applied with brake so as not to rotate, and the drive roll for transportation 64 applies a specific tension. Then, the unit of the stripper roll and the auxiliary roll moves straightly toward the film winding side in a state that the film embraces the stripper roll and the auxiliary roll. The above-described straight movement is carried out along the pair of the guides 125 for moving the stripper roll.

That is, the guide 125 for moving the stripper roll as the above-mentioned guide has a function to allow the stripper roll and the auxiliary roll to move reciprocally in parallel with the mold surface in the vicinity thereof while holding the relative positional relationship that the film embraces the stripper roll (FIGS. 8(c) to 8(f)).

When the stripper roll has returned to the end position at the winding side, the means for circular moving the auxiliary roll moves the auxiliary roll down to the generally bottom of the stripper roll to release the film. The releasing operation can be carried at the generally same speed as the roll peripheral speed of the driven stripper roll rotated by following rotation.

The motor 123 for directly moving the releasing roll is a drive means for moving the stripper roll in the vicinity of the mold surface in parallel therewith. The motor 123 may be preferably a servo motor, and a linear motor or the like. In addition, an electromagnetic cylinder, a pneumatic cylinder or the like may be used as the direct drive source.

At the time of film releasing, the stripper roll and the mold surface may be brought into contact with each other. In this case, elastic members such as air cylinder or spring are preferably disposed in the vicinity of the both ends of the stripper roll in the film width direction to thereby control the pressing force of the stripper roll on the mold surface.

When the fine projections and depressions shape on the mold surface is extremely minute and easily gets damage due to a contact with the stripper roll, a distance (clearance) H between the stripper roll and the mold surface shown in FIG. 2 is preferably 0.1 to 10 mm, more preferably 0.1 to 5 mm, furthermore preferably 0.1 to 1.0 mm.

When the clearance H is set to below 10 mm, film stripping point 127 (refer to FIG. 3(d)) comes immediately beneath the stripper roll, the stripping point 127 also preferably moves continuously together with the stripper roll. Contrarily, when the clearance H is set to be larger and the film is released at a high speed, the stripping point 127 may intermittently stop or move toward the feed-out side at a speed larger than the peripheral speed of the stripper roll. As a result, linear stripping traces in a width direction of the film may be caused at the stop point. The inventors investigated a preferable value of the clearance H and found that a range of 0.1 to 10 mm was preferable for smoothly releasing operation of the film. When the clearance H is below 0.1 mm, the mold surface and the stripper roll may come into contact with each other, and the pattern on the mold may get damage undesirably. Contrarily, when the clearance H is set to be more than 10 mm, as the releasing speed is increased, the releasing operation is performed discontinuously. As a result, undesired stripping traces may be generated on the pattern formed surface. The parallelism between the stripper roll and the mold surface is preferably 0.5 mm or less, more preferably 0.1 mm or less. Here, the parallelism can be measured from the mold surface as the reference by displacement sensors mounted at the both sides in the film width direction. That is, the wording "parallelism" means a difference between the mold surface and the roll peripheral surface measured at the both ends when the stripper roll is positioned immediately above the displacement sensor.

The stripper roll and the auxiliary roll are preferably provided with a cooling water circulation mechanism or the like to control the temperature of the respective rolls to a constant level. In the case of heat forming of the pattern, immediately after the film is released from the mold, the film has a high temperature. Therefore, the stripper roll and the auxiliary roll, which come into contact with the film immediately after the film is released from the mold, are preferably controlled to a constant temperature. The stripper roll and the auxiliary roll have such an effect to reduce the temperature of the film during the releasing operation and immediately after the release from the mold. Further, cooling of the stripper roll and the auxiliary roll is effective for stable carrying and winding of the film after pattern forming operation.

Furthermore, the stripper roll is preferably provided with a vibration means that causes the stripper roll to generate minute vibrations in a lateral direction. An electromagnetic actuator, linear actuator or ultrasonic transducer may be employed as the vibration means. Or, such a mechanism that causes the peripheral surface only of the stripper roll to generate the vibrations may be employed. The vibrations of the stripper roll or peripheral surface thereof propagate to the stripping point via the film embracing the rolls and facilitate the smooth release of the film.

To achieve stable releasing operation, the diameter of the stripper roll is preferably set to a range of 50 to 200 mm. When the diameter of the stripper roll is below 50 mm, the curvature is too large. The film, which is just released from the mold, hardly follows the configuration of the stripper roll. Curl or deformation may be caused on the film. Contrarily, when the diameter of the stripper roll is more than 200 mm, a space necessary for releasing operation is hardly ensured within the press unit in view of designing.

Figure 9:
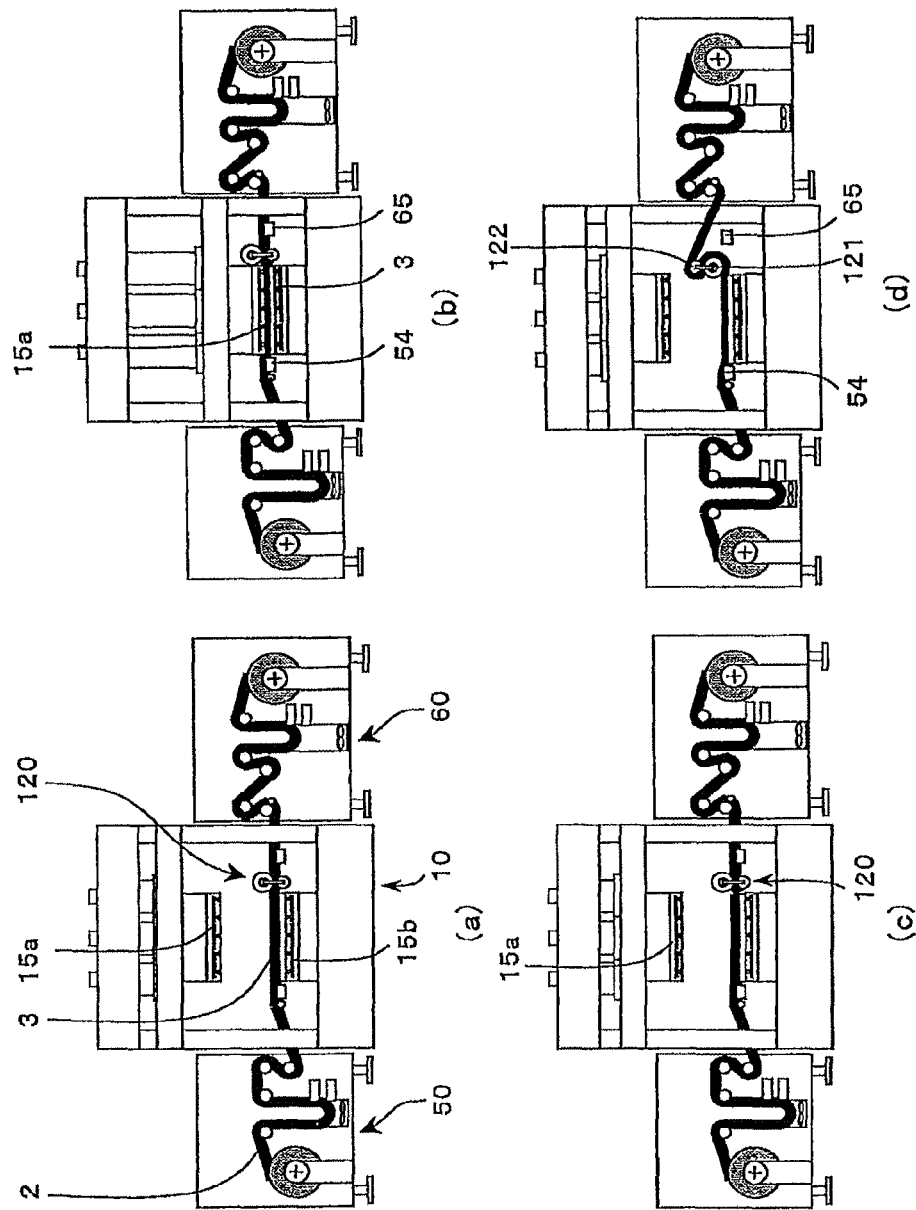
FIG. 9 is a sectional view of FIG. 6 as viewed from the film width direction schematically illustrating the process of an intermittent film forming method.
Figure 10:
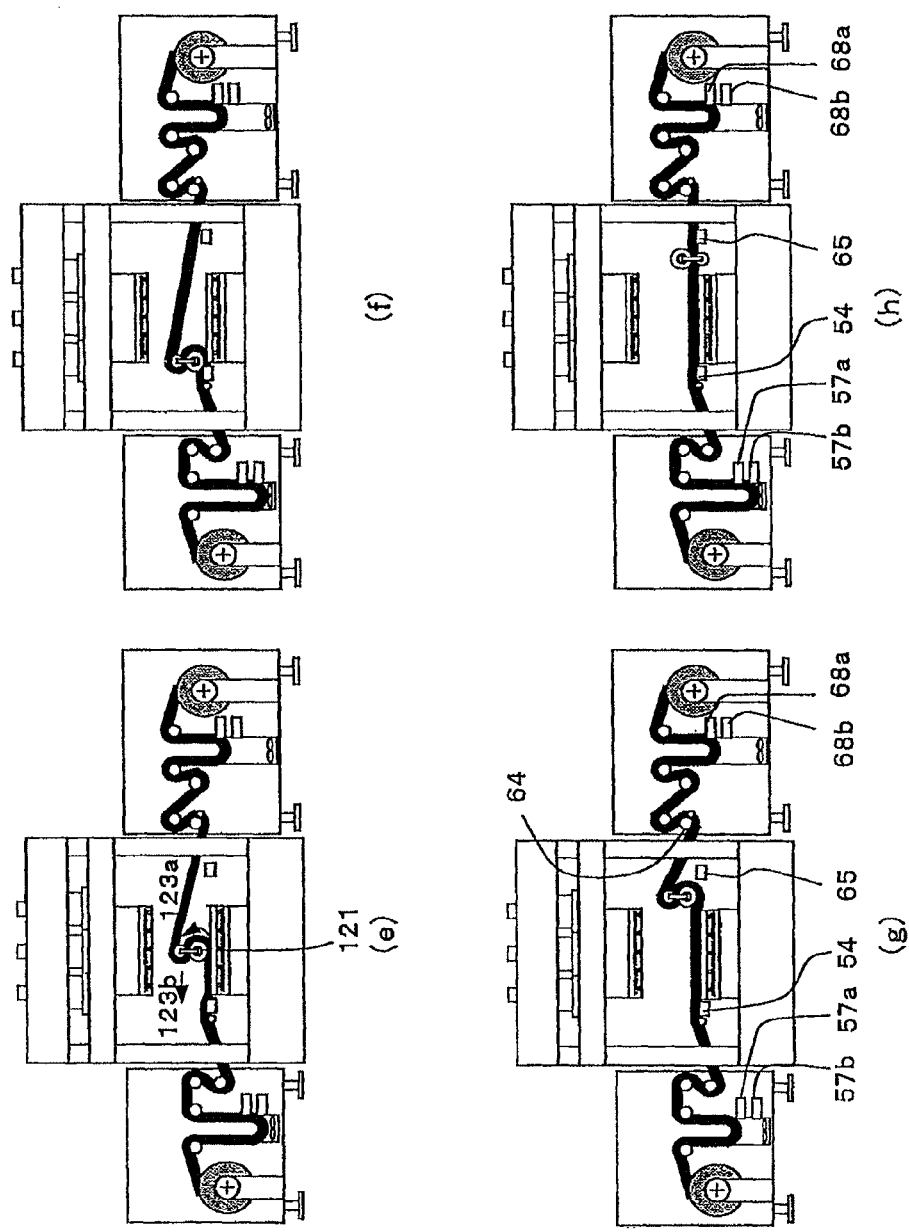
FIG. 10 is a sectional view of FIG. 6 as viewed from the film width direction schematically illustrating the process of an intermittent film forming method.

A sequential film forming operation by a second intermittent film forming system 101 according to exemplary embodiments of the present invention will be described with reference to FIG. 9 and FIG. 10. Points different from the above-described sequential film forming operations ((A) to (K)) by the first intermittent film forming system 1 according to exemplary embodiments of the present invention are steps ((G) to (I)) in which the film is released from the mold and the next film to be formed is supplied. The different points only will be described in (G') to (I') below.

(G') When the motor 123 for directly driving the releasing roll is activated at generally same time as the drive roll for transportation 64, the stripper roll 121 is driven to move in a direction of 123b while rotating on the film surface in a direction of 123a. The stripper roll 121 is driven to move being guided by the stripper roll direct moving guide provided to the press plate of the press. Thus, the film in close contact with the mold surface is released reliably (refer to FIG. 10(e)).

(H') When the film has been released up to the end of the mold 3 at the feed-out side, the stripper roll is stopped from rotating (refer to FIG. 10(f)).

(I') Then, the stripper roll is applied with brake so as not to be rotated, the film fixing part 54 is released, and drive roll for transportation 64 is activated to rotate. The motor 123 for directly moving the stripper roll is activated to move toward the winding side while maintaining the relative relationship between the stripper roll 121 and the auxiliary roll 122. At this time, a new part of the film to be formed next is pulled out from the feed-out side, and the pattern formed film is sent to the winding side (refer to FIG. 10(g)).

With this releasing operation, smooth releasing operation can be incorporated into the intermittent film forming cycle, and a high quality pattern formed film with little stripping traces is produced.

Also, with the operation at step (I'), the film to be formed in the next cycle can be swiftly supplied to the press unit. Therefore, the intermittent film forming is achieved with high productivity. Further, by combining the mold operation and the supply operation of the film, a high quality pattern formed film is produced with a high productivity.

The film 2 used in the intermittent film forming system of exemplary embodiments of the present invention is a film composed mainly of thermoplastic resin with the glass transition temperature Tg of preferably 40 to 180° C., more preferably 50 to 160° C., and most preferably 50 to 120° C. When the glass transition temperature Tg is lower than the above range, the heat resistance of pattern formed product is lowered and the shape thereof undesirably changes as time passes. Also, when the glass transition temperature Tg exceeds the range, the forming temperature has to be increased and the energy is inefficiently required. Further, the volume of the film during heat/cooling changes largely. As a result, the film adheres to the mold and is hardly released therefrom. Even when the film is released, the quality of the transferred pattern is degraded, or the pattern is partially damaged resulting in a defective film.

The film 2 applied to exemplary embodiments of the present invention is mainly composed of thermoplastic resin, in particular, preferably, the film 2 is composed of polyester resin such as polyethylene terephthalate, polyethylene-2,6-naphthalate, polypropylene terephthalate and polybutylene terephthalate, polyolefin resin such as polyethylene, polystyrene, polypropylene, polyisobutylene, polybuten, polymethylpentene, polyamide resin, polyimide resin, polyether resin, polyester amide resin, polyetherester resin, acrylic resin, polyurethane resin, polycarbonate resin, or polychlorinated vinyl resin. Since various kinds of copolymer monomers are available and therefore material properties are easily controllable, particularly, the film 2 is composed preferably of a thermoplastic resin selected from polyester resin, polyolefin resin, polyamide resin, acrylic resin or mixture thereof in the above-listed resins. More preferably, the film 2 is composed of above-listed thermoplastic resin of 50% by weight or more.

The film, which is applied to the film forming system and the forming method according to exemplary embodiments of the present invention to be processed, may be film composed of a single resin, or may be a lamination composed of a plurality of resin layers selected from the above-listed resins. In the case of a lamination composed of a plurality of resin layers, compared to a single sheet, surface features such as sliding, wear resistance and the like, mechanical strength and heat resistance can be given. In the case of lamination including a plurality of resin layers, it is preferred that the entire of the sheet satisfy the above-mentioned requirements. Even when the entire of the film fails to satisfy the requirements, when at least a layer satisfying the above requirements is formed on the surface layer, the pattern can be easily formed on the surface.

The thickness (thickness, film thickness) of the film applied to exemplary embodiments of the present invention is preferably in a range of 0.01 to 1 mm. When the thickness is below 0.01 mm, the thickness is not sufficient for forming the pattern. When the thickness exceeds 1 mm, due to the stiffness of the film, generally, the film is hardly carried.

As available forming methods of the film applied to exemplary embodiments of the present invention, for example, in the case of a single sheet, there is a method (melting casting), in which a sheet forming material is heated and melted in an extruder, and is extruded on a cooled cast drum from a cap to form the film in a sheet state. There is another method (solution casting), in which a sheet forming material is dissolved into a solvent, the solution is extruded on a support medium such as a cast drum or endless belt from a cap into a film and subsequently solvent is heated to remove from film layer.

As available manufacturing methods of lamination, there are a method (co-extrusion), in which two different thermoplastic resins are put into two extruders and molten, then is co-extruded onto a cool cast drum from a mouth piece to form a sheet; a method (melting casting), in which cover material is put into extruder and molten, and is extruded through a cap to laminate onto a single sheet; a method (heat lamination) in which after separately forming a single sheet and a film of easy-to-surface forming as a single film respectively, the films are laminated with a pressure using heated rolls; and a method (coating method) in which after dissolving a sheet forming material into a solvent, the solution is applied to a sheet, and the like. For the easy-to-surface forming sheet lamination also, the above melting casting, heat lamination, coating method are available. The base material may be previously processed with a base conditioner or primer. Further, compound material with another functional base material is also preferred.

The film applied to exemplary embodiments of the present invention may be added with various additives during or after polymerization. As examples of available additives, for example, organic fine particles, inorganic fine particles, dispersant, colorant, fluorescent whitener, antioxidant, weather resistant agent, antistatic agent, mold release agent, thickening agent, plasticizer, pH adjuster, salt and the like are given. Particularly, as the mold release agent, a little amount of carboxylic acid and derivatives thereof such as long chain carboxylic acid, long chain carboxylic acid salt or the like with a low surface tension, and alcohol compounds such as long chain alcohol and derivatives thereof, denatured silicone oil etc with a low surface tension may be preferably added during polymerization.

The film applied to exemplary embodiments of the present invention may be preferably laminated with a mold-releasing layer on the surface pattern forming layer. By previously forming the mold-releasing layer on the top surface of the film; i.e., the surface that comes into contact with the mold, the durability (number of repeated uses) of release-coat formed on the mold surface can be increased. Even when a mold the releasing effect of which is partially lost is used, the film can be released with no problem. Also, by previously forming a mold-releasing layer on the film, even when the mold is not processed with releasing coating, the film can be released, and the cost for the release processing on the mold can be preferably reduced. Furthermore, when the pattern-formed sheet is released from the mold, the formed pattern can be prevented from being damaged due to adhesion of resin. Furthermore, the film can be released at a high temperature. Accordingly, in the aspect of pattern-forming accuracy as well as productivity, the cycle time can be preferably reduced. Furthermore, by increasing the sliding performance on the surface of the pattern-formed sheet, the scratch resistance is increased and defects generated during manufacturing can be preferably reduced.

When the pattern-forming layer is laminated at the both outermost layers sandwiching the supporting layer, the mold-releasing layer may be formed only on one surface or both of the surfaces of the pattern-forming layer.

Although particularly limited, the resin for forming the mold-releasing layer may be preferably composed of mainly silicone resin, fluorine resin, fatty acid resin, polyester resin, olefin resin, melamine resin. In these resins, silicone resin, fluorine resin, fatty acid resin are more preferable. For the mold-releasing layer, in addition to the above resins, for example, acrylic resin, urethane resin, epoxy resin, urea resin, phenol resin or the like may be blended. Also, various additives of for example, antistatic agent, surface-active agent, antioxidant, heat stabilizer, weatherproof agent, ultraviolet light absorbent, pigment, colorant, organic or inorganic fine particles, filler, core material, cross-linking agent or the like may be blended. Although not particularly limited, the thickness of the mold-releasing layer is preferably 0.01 to 5 μm. When the thickness of the mold-releasing layer is 0.01 μm or less, the above-described releasing performance from the mold may be decreased.

Although not particularly limited, the method of forming the mold-releasing layer, various application methods are available. For example, reverse coating, gravure coating, rod coating, bar coating, mold coating, splay coating or the like may be used. Line coating, in which the above-mentioned application is carried out with film forming simultaneously, is preferable in view of the productivity and uniform application.

EXAMPLE 1

(1) Mold:
The mold was manufactured as described below.
Mold size: 500 mm (film width direction)×800 mm (film feed direction)×20 mm (thickness)
Mold material: copper
Fine shape: pitch was 50 μm, width of projection was 25 μm, height of projection was 50 μm; and sectional shape was rectangular as viewed from the film feed direction.

(2) Press:
Maximum pressure was 3000 kN using a hydraulic pump. Within the press, upper and lower temperature control plates made of aluminum alloy; size was 700 mm (film width direction)×1000 mm (film feed direction) were provided. Each of the temperature control plates was linked to a heating/cooling unit. The mold was attached to the lower temperature control plate. The heating unit was a heat medium circulation system. The heat medium was BARELL THERM #400 (MATSUMURA OIL CO., LTD.), and was heated to 150° C. and flown at a flow rate of 100 L/min. Cooling unit was a cooling water circulation system. Water was cooled to 20° C. and flown at a flow rate of 150 L/min.

(3) Releasing Device:
The releasing device having the same arrangement as that shown in FIG. 2 was used in combination of the stripper roll and the auxiliary roll. The outer diameter of the stripper roll was 150 mm. The surface was covered with a silicone with rubber hardness of 60 (JIS K6253) and centerline average roughness of 0.5 µm (JIS B0601). The stripper roll was linked to a spin drive means composed of a servomotor. The outer diameter of the auxiliary roll was 50 mm. The surface was covered with a silicone rubber with rubber hardness of 60 (JIS K6253) and surface centerline average roughness of 0.5 µm (JIS B0601). The auxiliary roll was mounted freely rotatably. The distance (clearance) between the stripper roll and the mold surface was 15 mm.

(4) Film:

The film was made from polyethylene terephthalate. Thickness was 100 µm (thickness unevenness: ±10 µm); width was 520 mm. The film was fed out from a feed out unit and wound by a winding unit disposed at the opposite sides respectively being interposed by the press unit.

(5) Operation Method:

Using the above system, the pattern forming was carried out intermittently as described below. The film was previously fed out from the feed-out unit to the winding unit through the press unit. After heating the upper and lower temperature control plates up to 110° C., the upper plate was lowered to start the film press. The press on the mold surface was carried out for 30 sec. at a pressure of 5 MPa. After that, the temperature of the upper and lower control plates was cooled down while maintaining the press. When the temperature of the control plates was cooled down to 60° C., the cooling was terminated. After completing the cooling of the upper and lower control plates, the press was released. The upper plate was raised up to the upper limit, and the releasing device was activated.

After the auxiliary roll was driven to move to the top of the stripper roll so that the film embraces the rolls and the stripper roll was driven to rotate at a peripheral speed of 10 m/minute. While rotating, the stripper roll was driven to move to the feed-out side to release the film from the mold. While applying brake to the stripper roll in the rotation direction to impart a tension to the film with the drive roll for transportation located at the winding unit side, the film from was released from the mold. The stripper roll was pulled toward the downstream side up to the end of the press unit located at the winding side at a speed of 20 m/minute along with the releasing device to set new film to be pattern formed next on the mold surface. After that, the auxiliary roll was driven to pivot and return to the previous position.

The above-described operation was repeated and 10 pattern formed films were obtained. The pattern formed surface was visually inspected. As a result, no stripping trace was found; thus entirely uniform pattern formed film was obtained. The time from the start of releasing operation of a film to the completion of the supply of a new film was 25 seconds. Conditions and results are indicated in Table 1, Table 2 and Table 3.

EXAMPLE 2

10 pattern formed films were obtained using the same system and under exactly same conditions as those of the example 1 excepting a point that the peripheral speed of the stripper roll was increased to 20 m/minute during releasing the film from the mold. The pattern-formed surface was visually inspected. The appearance was generally acceptable. Slight linear stripping traces were found in a TD direction. The time from the start of releasing operation of a film to the completion of the supply of a new film was 15 seconds. Conditions and results are indicated in Table 1, Table 2 and Table 3.

EXAMPLE 3

10 pattern formed films were obtained using the same system and under exactly same conditions as those of the example 2 excepting a point that the clearance between the stripper roll and the mold surface was reduced to 2 mm. The pattern formed surface was visually inspected. The appearance was generally acceptable. No stripping trace was found and entirely uniform pattern formed films were obtained. The time from the start of releasing operation of a film to the completion of the supply of a new film was 15 seconds. Conditions and results are indicated in Table 1, Table 2 and Table 3.

EXAMPLE 4

(1) Mold:

The mold was manufactured as described below.

Mold size: 500 mm (film width direction)×800 mm (film feed direction)×20 mm (thickness)

Mold material: copper

Fine pattern: pitch was 50 µm, width of projection was 25 µm, height of projection was 50 µm; and sectional shape was rectangular as viewed from the film feed direction.

(2) Press:

Maximum pressure was 3000 kN using a hydraulic pump. Within the press, upper and lower temperature control plates made of aluminum alloy; size was 700 mm (film width direction)×1000 mm (film feed direction) were provided. Each of the temperature control plates was linked to a heating/cooling unit. The mold was attached to the lower temperature control plate. The heating unit was a heat medium circulation system. The heat medium was BARELL THERM #400 (MATSUMURA OIL CO., LTD.), and was heated to 150° C. and flown at a flow rate of 100 L/min. Cooling unit was a cooling water circulation system. Water was cooled to 20° C. and flown at a flow rate of 150 L/min.

(3) Releasing Device:

The releasing device having the same arrangement as that shown in FIG. 7 was used in combination of the stripper roll and the auxiliary roll. The outer diameter of the stripper roll was 150 mm. The surface was covered with a silicone with rubber hardness of 60 (JIS K6253) and surface centerline average roughness of 5 µm (JIS B0601). The stripper roll was mounted freely rotatably. The outer diameter of the auxiliary roll was 50 mm. The surface was covered with a silicone rubber with rubber hardness of 60 (JIS K6253) and surface centerline average roughness of 5 µm (JIS B0601). The auxiliary roll was mounted freely rotatably. The distance (clearance) between the stripper roll and the mold surface was 15 mm. The stripper roll was connected to a releasing roll direct drive unit composed of a servomotor so as to reciprocate in the film feed direction being speed controlled.

(4) Film:

The film was made from polyethylene terephthalate. Thickness was 100 µm (thickness unevenness: ±10 µm); width thereof was 520 mm. The film was fed out from a winding unit and wound by a winding unit disposed at the opposite sides respectively being interposed by the press unit.

(5) Means for Imparting a Tension to the Film:

A means for imparting a tension to the film, in which a nip carrying roll was disposed between the releasing device and the winding unit to impart a tension to the film, was used. More particularly, the tension detecting means was disposed between the drive roll for transportation 64 and the stripper roll 21 as the component parts of the means for imparting a tension to the film. The tension detecting means was composed of a tension detection guide roll 72 and a tension meter 73. The means for imparting a tension to the film was for controlling the drive motor of the drive roll for transportation 64 to maintain the tension value detected by the tension meter 73 to a constant value during the film releasing operation. The tension meter detects the tension with a load cell attached to the support of the bearings located at the both ends of the tension detecting guide roll 72. Here, the tension detecting guide roll is preferably rotatably held to reduce the mechanical loss at the bearings to as small as possible.

(6) Operation Method:

Using the above system, the film forming operation was carried out intermittently as described below. The film was previously fed out from the feed-out unit to the winding unit through the press unit. After heating the upper and lower temperature control plates up to 110° C., the upper plate was lowered to start pressing the film. The press on the mold surface was carried out for 30 sec. at 5 MPa. After that, the temperature of the upper and lower control plates was cooled down while maintaining the press. When the temperature of the control plates was cooled down to 60° C., the cooling was terminated. After completing the cooling the upper and lower control plates, the press was released. The upper plate was raised up to the upper limit, and the releasing device was activated.

After moving the auxiliary roll up to a point above the top of the stripper roll so that the film embraces the rolls, the releasing roll direct drive unit was activated to move the stripper roll to the feed-out side at a speed of 10 m/minute. Then a tension of 9.8 N was applied to the film in full width by the means for imparting a tension to the film.

Then, the stripper roll was moved to release the film from the mold. After fully releasing the film from the mold, the release roll direct drive unit was activated to move the stripper roll toward the winding side at a speed of 20 m/minute while applying a brake in a rotation direction of the stripper roll. The drive roll for transportation applied a tension of 9.8N. After that, the auxiliary roll was moved to return to the previous position.

The above-described operation was repeated, and 10 pattern formed films were obtained. The pattern formed surface was visually inspected. As a result, no stripping trace was found. Entirely uniform pattern formed film was obtained.

The time from the start of releasing operation of a film to the completion of the supply of a new film was 25 seconds. Conditions and results are indicated in Table 1, Table 2 and Table 3.

EXAMPLE 5

10 pattern formed films were obtained using the same system and under exactly same conditions as those of the example 4 excepting a point that the peripheral speed of the stripper roll during releasing the film from the mold was increased to 20 m/minute. The pattern formed surface was visually inspected. The appearance was generally acceptable. Slight linear stripping traces were found in a TD direction. The time from the start of releasing operation of a film to the completion of the supply of a new film was 15 seconds. Conditions and results are indicated in Table 1, Table 2 and Table 3.

EXAMPLE 6

10 pattern formed films were obtained using the same system and under exactly same conditions as those of the example 5 excepting a point that the clearance between the stripper roll and the mold surface was reduced to 2 mm. The pattern formed surface was visually inspected. The appearance was generally acceptable. No stripping trace was found, and entirely uniform pattern formed films were obtained. The time from the start of releasing operation of a film to the completion of the supply of a new film was 15 seconds. Conditions and results are indicated in Table 1, Table 2 and Table 3.

COMPARATIVE EXAMPLE 1

10 pattern formed films were obtained using the same system and under exactly same conditions as those of the example 1 excepting the points that the releasing device of the film used in example 1 to 6 was not used, and film was released only by means of a tension imparted at the winding side and operation for supplying new film to be formed with pattern was carried out. As a visual inspection of the pattern formed surface, two films were broken while the film was released from the mold. Many linear stripping traces were found in a TD direction on the rest 8 films. The time from the start of releasing operation from a film to the completion of supplying new film was 35 seconds. When the film tension was increased and the releasing operation in 35 seconds or less, many breaks occurred on the film during releasing operation. Conditions and results are indicated in Table 1, Table 2 and Table 3.

TABLE 1

| | Press | | | |
|---|---|---|---|---|
| | Pressure (MPs) | Forming time (sec.) | Forming temperature (° C.) | Releasing temperature (° C.) |
| Example 1 | 5 | 30 | 110 | 60 |
| Example 2 | 5 | 30 | 110 | 60 |
| Example 3 | 5 | 30 | 110 | 60 |
| Example 4 | 5 | 30 | 110 | 60 |
| Example 5 | 5 | 30 | 110 | 60 |
| Example 6 | 5 | 30 | 110 | 60 |
| Comparative example 1 | 5 | 30 | 110 | 60 |

TABLE 2

| | Releasing device | | | | | | |
|---|---|---|---|---|---|---|---|
| | Stripper roll rotary drive means Y/N | Stripper roll direct drive means Y/N | Stripper roll | | Auxiliary roll | | |
| | | | Roll outer diameter (mm) | Material hardness surface roughness | Roll outer diameter (mm) | Material hardness surface roughness | Clearance (mm) |
| Example 1 | Y | N | 150 | Silicone rubber 60 0.5 μm | 50 | Silicone rubber 60 0.5 μm | 15 |
| Example 2 | Y | N | 150 | Silicone rubber 60 0.5 μm | 50 | Silicone rubber 60 0.5 μm | 15 |
| Example 3 | Y | N | 150 | Silicone rubber 60 0.5 μm | 50 | Silicone rubber 60 0.5 μm | 2 |

TABLE 2-continued

| | Releasing device | | | | | | |
|---|---|---|---|---|---|---|---|
| | Stripper | Stripper | Stripper roll | | Auxiliary roll | | |
| | roll rotary drive means Y/N | roll direct drive means Y/N | Roll outer diameter (mm) | Material hardness surface roughness | Roll outer diameter (mm) | Material hardness surface roughness | Clearance (mm) |
| Example 4 | N | Y | 150 | Silicone rubber 60 5 μm | 50 | Silicone rubber 60 5 μm | 15 |
| Example 5 | N | Y | 150 | Silicone rubber 60 5 μm | 50 | Silicone rubber 60 5 μm | 15 |
| Example 6 | N | Y | 150 | Silicone rubber 60 5 μm | 50 | Silicone rubber 60 5 μm | 2 |
| Comparative example 1 | N | N | Released by imparting a tension to film at winding side. | | | | |

TABLE 3

| | Releasing conditions | | Result | |
|---|---|---|---|---|
| | Releasing speed (m/minute) | Film feed out speed (m/minute) | Stripping trace (Visual inspection) | Releasing time (S) |
| Example 1 | 10 | 20 | ○ Non | 25 |
| Example 2 | 20 | 20 | ○ to Δ A few linear stripping traces | 15 |
| Example 3 | 20 | 20 | ○ Non | 15 |
| Example 4 | 10 | 20 | ○ Non | 25 |
| Example 5 | 20 | 20 | ○ to Δ A few linear stripping traces | 15 |
| Example 6 | 20 | 20 | ○ Non | 15 |
| Comparative example 1 | 10 or less | 10 to 20 | X Stripping traces on the entire film | 35 |

What is claimed is:

1. An intermittent film forming system, comprising:
   a mold having a fine projections and depressions shape formed on the surface thereof;
   a press for pressing a film to the surface of the mold;
   a transportation for carrying the film; and
   a releasing device for releasing the film from the surface of the mold, wherein said releasing device is provided at least with:
   a stripper roll freely rotatably held for releasing the film;
   an auxiliary roll arranged substantially in parallel with the stripper roll across a film path line;
   a means for moving the auxiliary roll circularly along the periphery of the stripper roll such that the film embraces the stripper roll and the auxiliary roll;
   a means for moving said stripper roll in the vicinity of said mold surface in parallel therewith;
   a guide for moving said stripper roll and said auxiliary roll in the vicinity of the mold surface in parallel therewith while maintaining such a relative positional relationship that the film embraces the stripper roll; and
   a mechanism for imparting a tension to the film on the downstream side from said stripper roll in a film carrying direction.

2. The intermittent film forming system according to claim 1, wherein said mechanism for imparting a tension to the film employs a friction force between the surface of the auxiliary roll rotated by a means of rotary-driving and the surface of the film.

3. The intermittent film forming system according to claim 1, wherein said auxiliary roll is freely rotatably held, and said mechanism for imparting a tension to the film is placed on the downstream side from the auxiliary roll in the film carrying direction.

4. The intermittent film forming system according to claim 1, further comprising a means for detecting film tension disposed between said stripper roll and said mechanism for imparting a tension to the film, wherein tension imparting level of said means for imparting a tension to the film is controlled based on a value detected by the means for detecting film tension.

5. The intermittent film forming system according to claim 1 wherein the distance between said stripper roll and said mold surface at the time of film releasing is within a range of 0.1 to 10 mm.

* * * * *